US012594493B2

(12) United States Patent (10) Patent No.: US 12,594,493 B2
Sugahara et al. (45) Date of Patent: Apr. 7, 2026

(54) USER INTERFACE DEVICE

(71) Applicant: Murata Manufacturing Co., Ltd., Nagaokakyo (JP)

(72) Inventors: Kohei Sugahara, Nagaokakyo (JP); Hiroshi Watanabe, Nagaokakyo (JP); Koichi Inoue, Nagaokakyo (JP); Takatoshi Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 259 days.

(21) Appl. No.: 18/610,323

(22) Filed: Mar. 20, 2024

(65) Prior Publication Data

US 2024/0220033 A1 Jul. 4, 2024

Related U.S. Application Data

(63) Continuation of application No. PCT/JP2022/033738, filed on Sep. 8, 2022.

(30) Foreign Application Priority Data

Sep. 28, 2021 (JP) ................................. 2021-158194

(51) Int. Cl.
*A63F 13/24* (2014.01)
*A63F 13/211* (2014.01)
(Continued)

(52) U.S. Cl.
CPC ............ *A63F 13/24* (2014.09); *A63F 13/211* (2014.09); *A63F 13/213* (2014.09);
(Continued)

(58) Field of Classification Search
None
See application file for complete search history.

(56) References Cited

U.S. PATENT DOCUMENTS 11,504,615 B1 * 11/2022 Ikeda .................... A63F 13/245
2016/0356642 A1 12/2016 Uedaira
(Continued)

FOREIGN PATENT DOCUMENTS

JP 2017005428 A 1/2017
JP 2020091904 A 6/2020
(Continued)

OTHER PUBLICATIONS

International Search Report in PCT/JP2022/033738, mailed Nov. 29, 2022, 3 pages.
(Continued)

*Primary Examiner* — Jason T Yen
(74) *Attorney, Agent, or Firm* — Keating & Bennett, LLP

(57) ABSTRACT

A user interface device includes a grip including dimensions in a radial direction and a circumferential direction and extending in a longitudinal direction, and at least one optical sensor provided at the grip including a proximity sensor that includes a light emitter and a light receiver, and a force sensor to detect a contact force by an object. The proximity sensor emits light from the light emitter to a predetermined detection range around the force sensor, and detects when the object is in proximity to the force sensor according to a light reception result obtained by light incident from the detection range to be received by the light receiver. The detection range is biased to one side in the circumferential direction from a position of the force sensor toward an outer side portion in the radial direction, and is wider in the circumferential direction than in the longitudinal direction.

20 Claims, 21 Drawing Sheets

(51) Int. Cl.

| | | |
|---|---|---|
| *A63F 13/213* | (2014.01) | |
| *A63F 13/218* | (2014.01) | |
| *A63F 13/23* | (2014.01) | |
| *G06F 3/03* | (2006.01) | |
| *G06F 3/038* | (2013.01) | |

(52) U.S. Cl.
CPC ............ *A63F 13/218* (2014.09); *A63F 13/23* (2014.09); *G06F 3/0308* (2013.01); *G06F 3/038* (2013.01)

(56) References Cited

U.S. PATENT DOCUMENTS

| | | | |
|---|---|---|---|
| 2017/0235364 A1* | 8/2017 | Nakamura .............. | G06F 3/016 |
| | | | 345/156 |
| 2017/0329440 A1* | 11/2017 | Sturm ..................... | A63F 13/28 |
| 2019/0041999 A1 | 2/2019 | Hirata et al. | |
| 2020/0276497 A1* | 9/2020 | Nietfeld ................. | G06F 3/014 |
| 2021/0379486 A1 | 12/2021 | Ishikawa et al. | |

FOREIGN PATENT DOCUMENTS

| | | | |
|---|---|---|---|
| WO | 2017150127 A1 | 9/2017 | |
| WO | 2020079853 A1 | 4/2020 | |

OTHER PUBLICATIONS

Written Opinion in PCT/JP2022/033738, mailed Nov. 29, 2022, 3 pages.

\* cited by examiner

USER INTERFACE DEVICE

CROSS REFERENCE TO RELATED APPLICATIONS

This application claims the benefit of priority to Japanese Patent Application No. 2021-158194 filed on Sep. 28, 2021 and is a Continuation Application of PCT Application No. PCT/JP2022/033738 filed on Sep. 8, 2022. The entire contents of each application are hereby incorporated herein by reference.

BACKGROUND OF THE INVENTION

1. Field of the Invention

The present invention relates to techniques for using optical sensors in user interface devices to be gripped by a user.

2. Description of the Related Art

Japanese Unexamined Patent Application Publication No. 2020-091904 discloses a controller that detects a shape of a finger such as a hand sign by using an optical sensor. The controller includes a gripping member to be gripped by the hand of the user, a sensor array including optical sensors corresponding to a plurality of fingers, respectively, and a grip button provided separately from the optical sensors. In this controller, the optical sensor, which is a non-contact sensor, in which the optical axes of a light emitter and a light receiver are set so as to pass through the positions when the respective fingers are bent. Thus, when the user intentionally opens the hand and stretches the fingers, the light receiver does not receive the reflected light, whereas when the user bends the fingers, the reflected light is received from a position closer to the light emitter in the fingers as the bending amount increases.

SUMMARY OF THE INVENTION

Example embodiments of the present invention provide user interface devices each capable of easily detecting a state of being gripped by a user by using an optical sensor.

In an example embodiment of the present invention, a user interface device to be gripped by a user includes a grip including dimensions in a radial direction and a circumferential direction and extending in a longitudinal direction, and at least one optical sensor provided at the grip and including a proximity sensor including a light emitter and a light receiver, and a force sensor to detect a contact force by an object, the proximity sensor is operable to emit light from the light emitter to a predetermined detection range around the force sensor, and detect a state in which the object is in proximity to the force sensor in accordance with a light reception result obtained by light incident from the detection range to be received by the light receiver, and the detection range is biased to one side in the circumferential direction from a position of the force sensor in the grip toward an outer side portion in the radial direction, and is wider in the circumferential direction than in the longitudinal direction.

According to the user interface devices of example embodiments of the present invention, it is possible to easily detect the state of being gripped by the user by using the optical sensor.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Hereinafter, example embodiments of user interface devices according to the present invention will be described with reference to the accompanying drawings.

Each example embodiment is an example, and partial replacement or combination of configurations shown in different example embodiments is possible. In Example Embodiment 2 and subsequent example embodiments, the description of the matters common to Example Embodiment 1 will be omitted, and only the differences will be described. In particular, similar operations and effects due to similar configurations will not be sequentially described for each example embodiment.

Example Embodiment 1

In Example Embodiment 1, a controller using an optical sensor will be described as an example of a user interface device according to the present invention.

1. Controller

Figure 1:
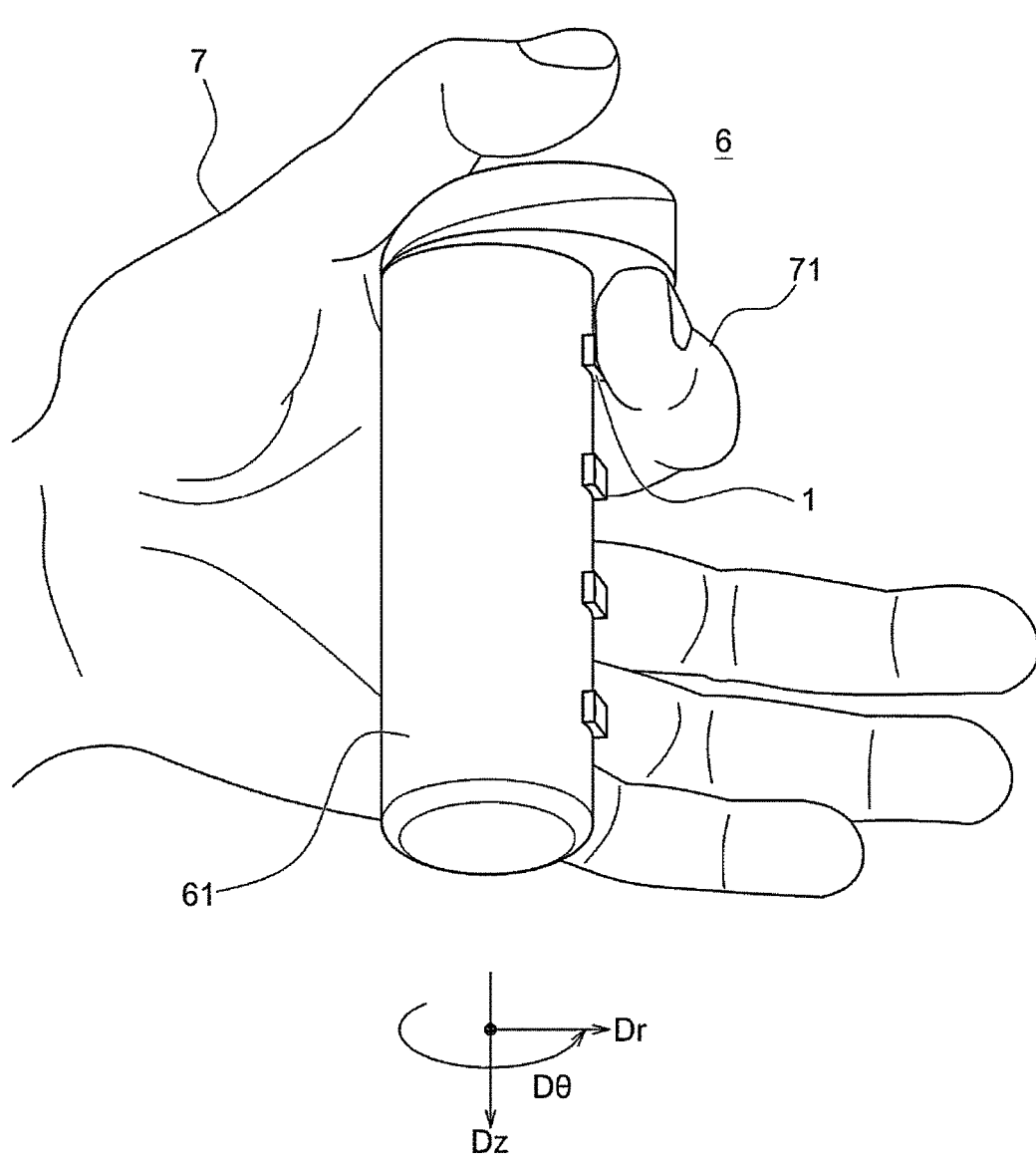
FIG. 1 is a perspective view illustrating an appearance of a controller according to Example Embodiment 1 of the present invention.
Figure 2:
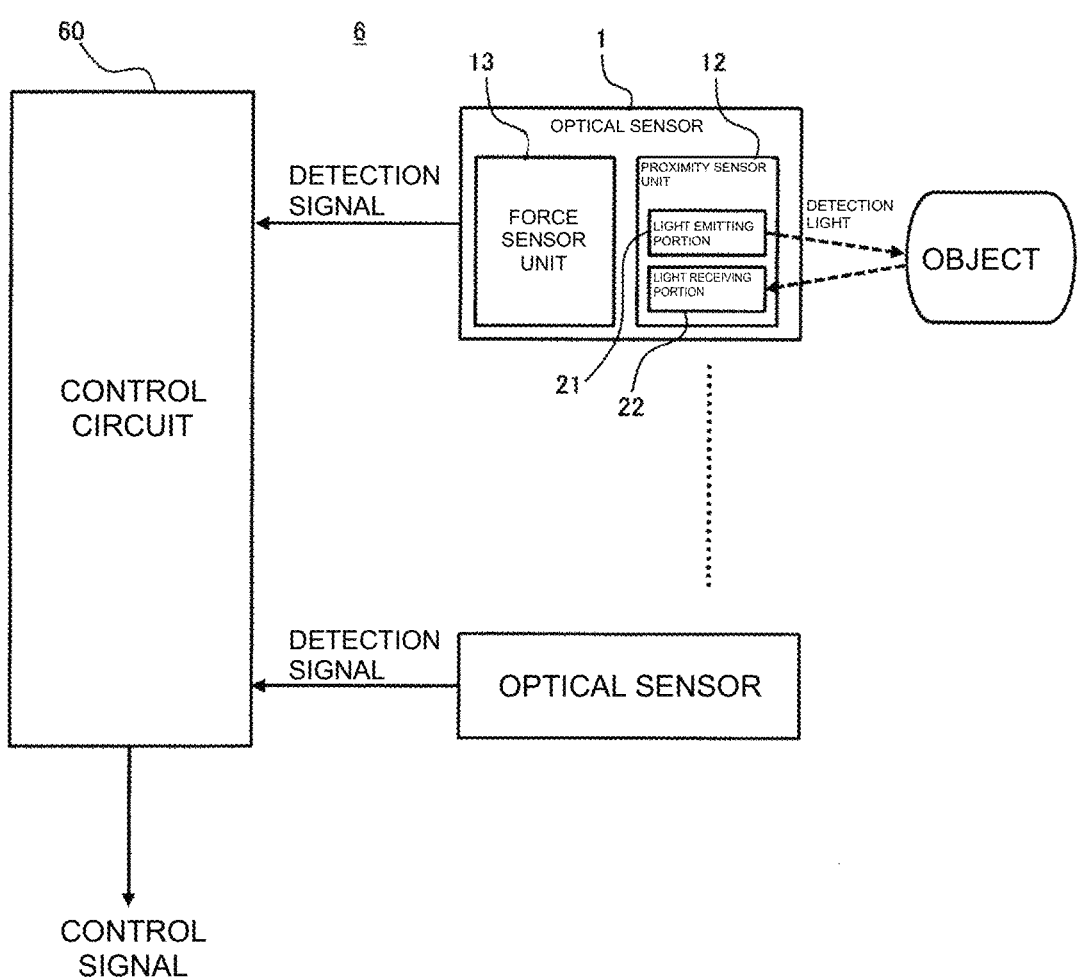
FIG. 2 is a block diagram illustrating a configuration of the controller according to Example Embodiment 1 of the present invention.

The controller according to the present example embodiment will be described with reference to FIG. 1 and FIG. 2. FIG. 1 is a perspective view illustrating an appearance of a controller 6 according to the present example embodiment. FIG. 2 is a block diagram illustrating the configuration of the controller 6.

The controller 6 of the present example embodiment is an example of a user interface device, which is to be gripped by a hand 7 of the user for inputting various operations. The controller 6 of the present example embodiment includes, for example, as illustrated in FIG. 1, a grip 61 to be gripped by the hand 7, and a plurality of optical sensors 1 provided on the grip 61. The controller 6 can be applied to various uses such as a game or control of various equipment as a human-machine interface (HMI) to transmit various instructions and intentions of a human to a machine or a device.

The grip 61 of the controller 6 has a grip shape in which a position to be gripped by the hand 7 is defined, for example, as illustrated in FIG. 1, and has, for example, a substantially cylindrical shape. The grip 61 has, for example, a radial direction Dr and a circumferential direction Dθ that define a substantially circular cross-sectional shape, and a longitudinal direction Dz corresponding to a direction in which a plurality of fingers 71 of the hand 7 is arranged. The grip 61 extends in the longitudinal direction Dz in a cross-sectional shape having the radial direction Dr and the circumferential direction De. The user of the controller 6 holds the controller 6, for example, by wrapping the fingers 71 of the hand 7 around the grip 61 along the circumferential direction De.

The optical sensor 1 of the present example embodiment is a sensor module in which a proximity sensor 12 that detects proximity of an object in an optical detection method and a force sensor 13 that detects force (that is, a contact force) acting when the object comes into contact with the sensor are integrally configured, for example, as illustrated in FIG. 2. In the example of FIG. 1, in the grip 61 of the controller 6, the four optical sensors 1 are provided in order to detect the four fingers 71 of the hand 7 as respective objects at positions with which fingertips of the respective fingers 71 come into contact when the grip 61 is gripped by the hand 7.

The controller 6 of the present example embodiment can continuously detect a series of processes in which the fingers 71 of the hand 7 each are in proximity to and comes into contact with the grip 61 to apply force, for example, by such arrangement setting of the optical sensors 1. Note that in the controller 6, the number of the optical sensors 1 to be provided is not particularly limited to the example of FIG. 1, and may be, for example, three or less or five or more.

Further, the number of fingers 71 to be detected in the controller 6 is not particularly limited.

In addition, the present example embodiment, the optical sensor 1 may be incorporated in various operators provided in the controller 6. For example, the controller 6 may be provided with various operators such as a button, a switch, and a retractable lever. Further, the controller 6 may include a cover covering the optical sensor 1. The cover may define an operator of the controller 6. According to the controller 6 of the present example embodiment, the optical sensor 1 can continuously detect states before and after contact when the user operates the operator with the finger 71, for example.

In the optical sensor 1 of the present example embodiment, for example, as illustrated in FIG. 2, the proximity sensor 12 includes a light emitter 21 and a light receiver 22, and realizes optical proximity sensing. The light emitter 21 emits light to detect the proximity of an object (hereinafter referred to as "detection light"). The light receiver 22 receives reflected light obtained by reflecting the detection light from the light emitter 21 by the object and generates a signal corresponding to, for example, the amount of received light, thereby detecting a state in which the object is in proximity.

In the present example embodiment, the force sensor 13 can use various force detection methods to detect force from an object. The various force detection methods include, for example, a piezoelectric method, an optical method, a strain resistance method, and a capacitive method. The force sensor 13 detects forces in multiple axes such as three axes or six axes. The force sensor 13 may detect a uniaxial force.

According to the optical sensor 1 of the present example embodiment, the proximity sensing function and the force sensing function are integrally realized, and thus it is possible to reduce the area required for incorporating these functions into the controller 6, and to easily configure the controller 6. A configuration example of the optical sensor 1 will be described later.

The controller 6 of the present example embodiment may further include a control circuit 60, for example, as illustrated in FIG. 2, the control circuit 60 being configured or programmed to control, for example, the entire operation of the controller 6. For example, the control circuit 60 generates a control signal corresponding to the operation content of the user based on the detection signal indicating the detection result of the proximity and the force by each optical sensor 1. The control signal may be output to a device outside the controller 6 or may be used for control inside the controller 6. The control circuit 60 may control the driving of each optical sensor 1.

The control circuit 60 is configured by, for example, a CPU, and realizes a predetermined function in cooperation with software. The control circuit 60 includes internal memories such as a ROM and a RAM, reads data and programs stored in the ROM into the RAM, and performs various arithmetic processing to realize various functions. Note that the control circuit 60 may be a hardware circuit such as a dedicated electronic circuit or a reconfigurable electronic circuit designed to realize a predetermined function. The control circuit 60 may be configured by various semiconductor integrated circuits such as a CPU, an MPU, a DSP, an FPGA, and an ASIC. Note that the control circuit 60 may be an external component of the controller 6 (or the user interface device).

1-1. Detection Range of Optical Sensor

Setting of a range in which the optical sensor 1 detects a state where the object such as the finger 71 is in proximity, that is, a detection range in the controller 6 of the present example embodiment will be described with reference to FIG. 3 to FIGS. 6A to 6C.

The optical sensor 1 of the present example embodiment has a detection range A10 defined by the directivity of the detection light emitted and received by the light emitter 21 and the light receiver 22 of the proximity sensor 12 (FIG. 2). Further, the optical sensor 1 includes a main surface arranged along the outer surface of the grip 61, for example. Two directions corresponding to the main surface of the optical sensor 1 are defined as X and Z directions, and a normal direction orthogonal to the X and Z directions is defined as a Y direction.

The X direction of the optical sensor 1 in the controller 6 corresponds to the circumferential direction Dθ of the grip 61 in the vicinity of the arrangement position of the optical sensor 1. One side on which the finger 71 of the hand 7 gripping the grip 61 arrives, of the ±X sides corresponding to both sides in the circumferential direction De, is defined as the +X side. Further, the outside of the grip 61 in the radial direction Dr corresponds to the +Y side of the optical sensor 1, and the inside of the grip 61 in the radial direction Dr corresponds to the −Y side. The Z direction of the optical sensor 1 corresponds to the longitudinal direction Dz of the grip 61.

Figure 3:
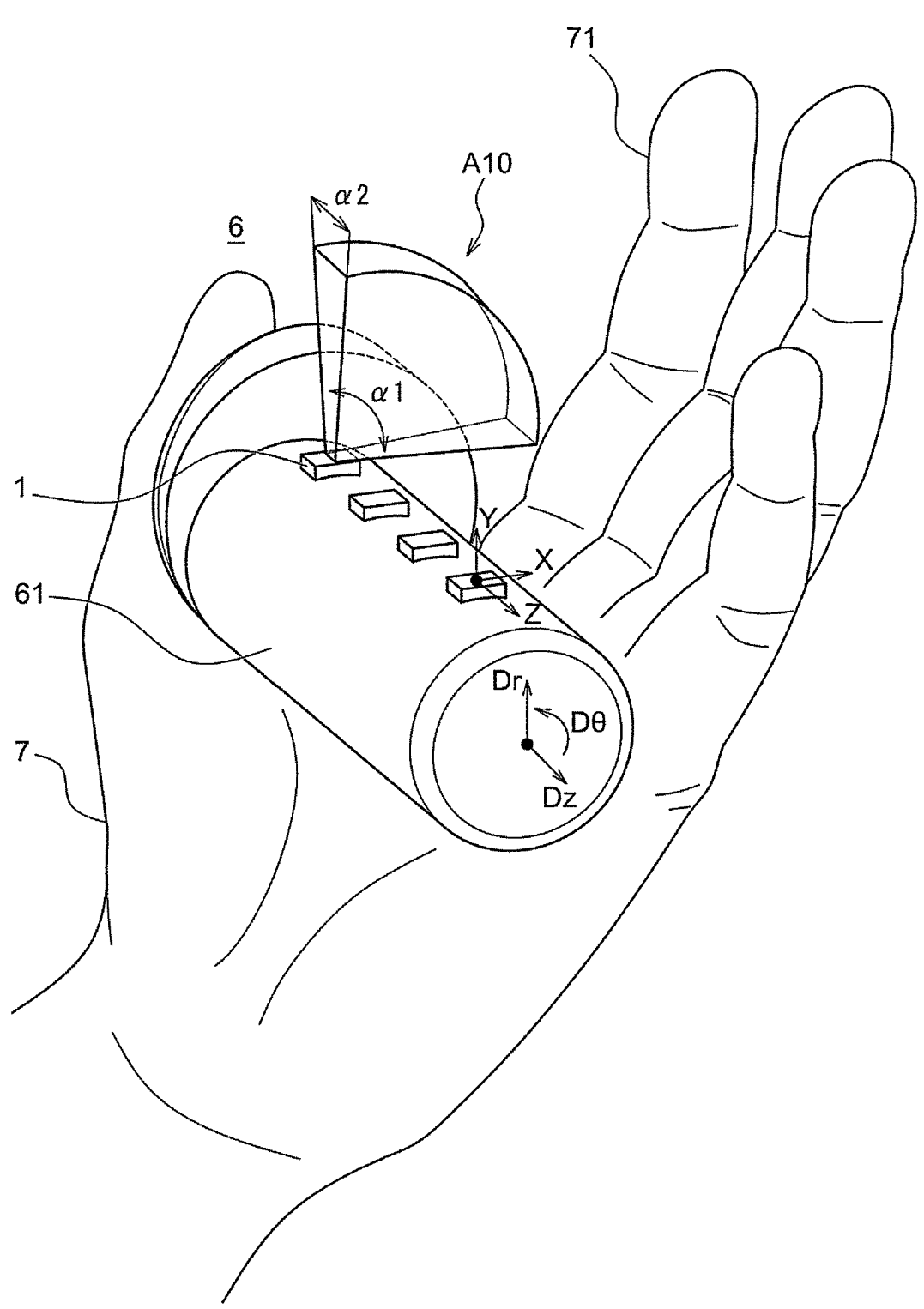
FIG. 3 is a diagram for explaining a detection range of an optical sensor in the controller.

In the controller 6 of the present example embodiment, the detection range A10 of the optical sensor 1 is set to a range biased to the +X side rather than the −X side of the ±X sides corresponding to both sides of the circumferential direction Dθ of the grip 61, and is inclined with respect to the Y direction, for example, as illustrated in FIG. 3. According to the detection range A10 inclined to the +X side, the finger 71 that arrives at the grip 61 when the user operates the controller 6 with the hand 7 is easily included in the detection range A10, and various states of the hand 7 during operation or the like can be easily detected.

The detection range A10 of the optical sensor 1 is defined by an angular width α1 in an XY plane corresponding to the circumferential direction Dθ of the grip 61 and an angular width α2 in a YZ plane corresponding to the longitudinal direction Dz. In the present example embodiment, in the detection range A10 of the optical sensor 1, the angular width α1 in the circumferential direction Dθ is set to be a relatively wide angle, and the angular width α2 in the longitudinal direction Dz is set to be a relatively narrow angle.

According to the angular width A1 of the wide angle in the circumferential direction Dθ in the detection range A10 of the optical sensor 1, when the specific finger 71 as the detection target in the hand 7 gripping the grip 61 has various degrees of bending, the amount of light received in the detection range A10 is easily changed according to the degree of bending. This makes it easy for each optical sensor 1 to detect the state of the finger 71, such as the degree of bending of the finger 71, which is the detection target. For example, the angular width A1 of the wide angle is an angle of equal to or more than about 45°, and is, for example, approximately 90°.

In contrast, when the angular width A1 of the above wide angle is not used, only a specific position in the circumferential direction Dθ can be set as a detection target, and for example, only a change in the distance to a detectable portion of the finger 71 can be detected. In addition, the angular width A1 of the wide angle set in the optical sensor 1 of the present example embodiment may be an angle of equal to or less than about 120° in terms of, for example, suppressing power consumption for emitting the detection light.

Further, according to the angular width A2 of the narrow angle in the longitudinal direction Dz in the detection range A10 of the optical sensor 1, for example, the finger 71 different from the finger 71 to be detected by the specific optical sensor 1 among the plurality of optical sensors 1 can be easily removed from the detection range A10 of the optical sensor 1. This makes it possible to easily avoid a situation in which, for example, each optical sensor 1 erroneously detects the finger 71 other than the detection target.

For example, the angular width A2 of the narrow angle set in the optical sensor 1 of the present example embodiment is an angle of equal to or more than about 1° and equal to or less than about 60°. The angular width A2 is a configurable as appropriate from various viewpoints such as the distance from the finger 71 to the optical sensor 1 at which erroneous detection by the optical sensor 1 is to be avoided or the degree to which erroneous detection is to be eliminated. For example, in order to avoid erroneous detection of the finger 71 (see FIG. 4A) located relatively far from the optical sensor 1, the angular width A2 may be set to equal to or less than about 20° from the viewpoint of excluding the adjacent finger 71 from the detection range A10 in consideration of the interval between the fingers 71 of the hand 7 gripping the grip 61. Alternatively, in order to avoid erroneous detection of a relatively close finger (see FIG. 4B), the angular width A2 may be equal to or less than about 40°, for example. The setting of the angular width A2 can be appropriately changed according to the size and bending state of the finger 71 of the hand 7, the outer diameter of the grip 61, the arrangement of the optical sensors 1, and the like.

The attachment position of the optical sensor 1 on the controller 6 will be described with reference to FIGS. 4A to 4C. In the controller 6 of the present example embodiment, the optical sensor 1 is attached, for example, within a range of an angle of equal to or more than about 90° and equal to or less than about 180° from a predetermined reference position P0 indicating an angle of 0° in the circumferential direction Dθ of the grip 61. The reference position P0 is set as a reference at which the contact is maintained even in a state where the finger 71 of the hand 7 gripping the grip 61 is stretched, and is set at a position assumed to be a contact point in the grip 61, which comes into contact with the base of the finger, for example.

Figure 4A:
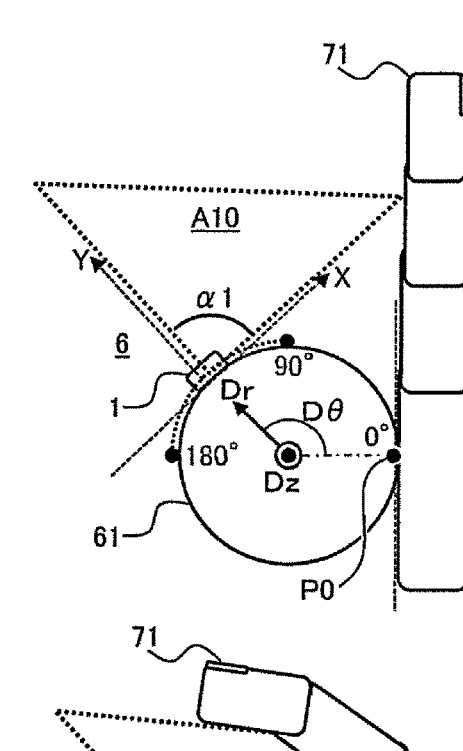
FIGS. 4A to 4C include views each illustrating a state in which a grip of the controller is gripped.
Figure 4B:
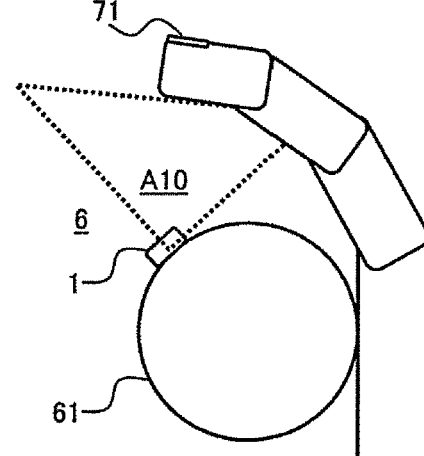
Figure 4C:
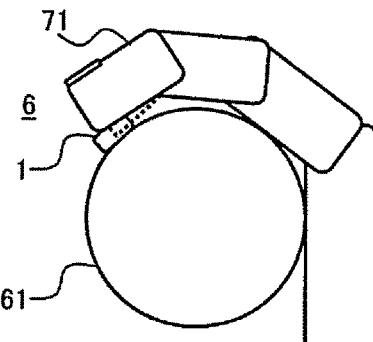

FIGS. 4A to 4C illustrate a series of states of the finger 71 when gripping the grip 61. FIG. 4A illustrates a state in which the finger 71 of the hand 7 (gripping the grip 61) is stretched. FIG. 4B illustrates a state in which the finger 71 is bent in the middle of gripping the grip 61 from the state of FIG. 4A. FIG. 4C illustrates a state in which the finger 71 is further bent from the state of FIG. 4B to grip the grip 61.

According to the optical sensor 1 of the controller 6 of the present example embodiment, for example, as illustrated in FIGS. 4A to 4C, the angular portion overlapping the finger 71 in the angular width A1 of the detection range A10 gradually increases from the state in which the finger 71 is stretched to the state in which the finger 71 is bent to grip the grip 61. Thus, in the optical sensor 1, the amount of received light changes in accordance with the degree of bending of the finger to a greater extent than the increase in the amount of received light when the distance between the object and the optical sensor 1 becomes shorter, for example, and the accuracy of continuously detecting the bending state of the finger 71 can be improved. In addition, in the example of FIG. 4A, the finger 71 is in the detection range A10 from the stretched state, and such a state can be detected by the optical sensor 1.

Figure 5A:
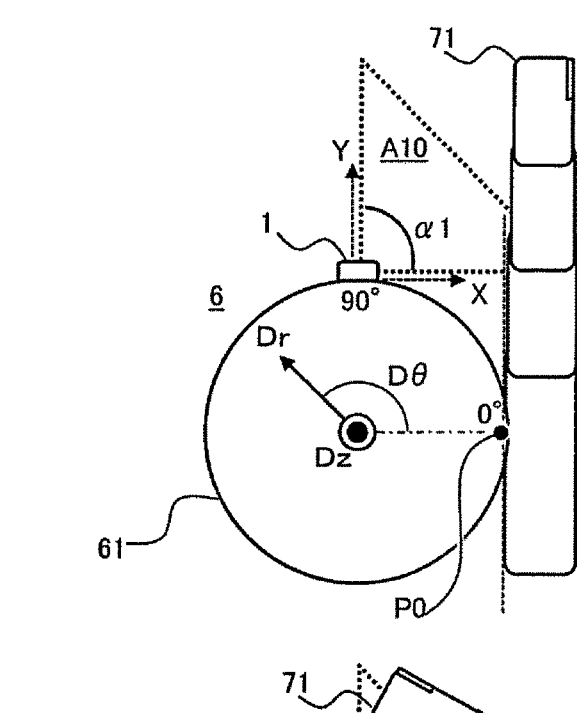
FIGS. 5A to 5C include views each illustrating a case where the diameter is larger than that of the grip of FIGS. 4A to 4C.
Figure 5B:
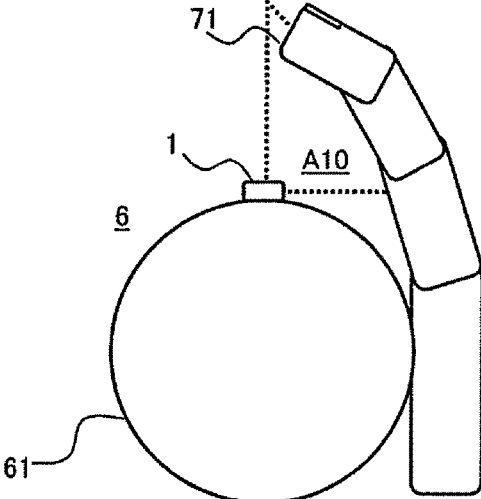
Figure 5C:
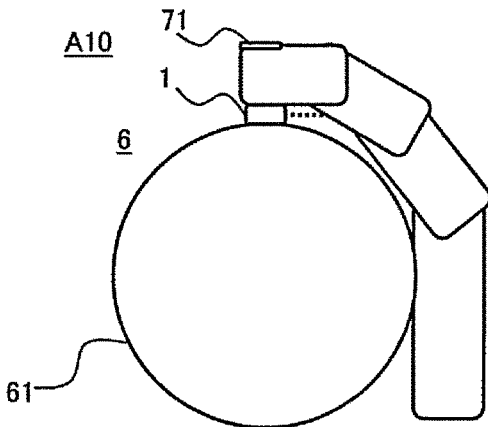

FIGS. 5A to 5C illustrate a case where the outer diameter of the grip 61 is larger than that in FIGS. 4A to 4C. FIG. 5A illustrates a state in which the finger 71 is stretched as in FIG. 4A. FIG. 5B illustrates a state in which the grip 61 is in the middle of being grabbed after the state of FIG. 5A. FIG. 5C illustrates a state in which the grip 61 is gripped after the state of FIG. 5B.

When the grip 61 has a relatively large diameter, or when the user's finger 71 is assumed to be short relative to the outer diameter of the grip 61, the attachment position of the optical sensor 1 may be set closer to the reference position P0. For example, the attachment position of the optical sensor 1 in the circumferential direction Dθ may be at an angle in the vicinity of about 90°. Even in this case, for example, as illustrated in FIGS. 5A to 5C, the portion where the detection range A10 and the finger 71 overlap each other in the angular width A1 changes according to the bending state of the finger, and thus it is possible to easily realize continuous detection of the bending process of the finger.

Figure 6A:
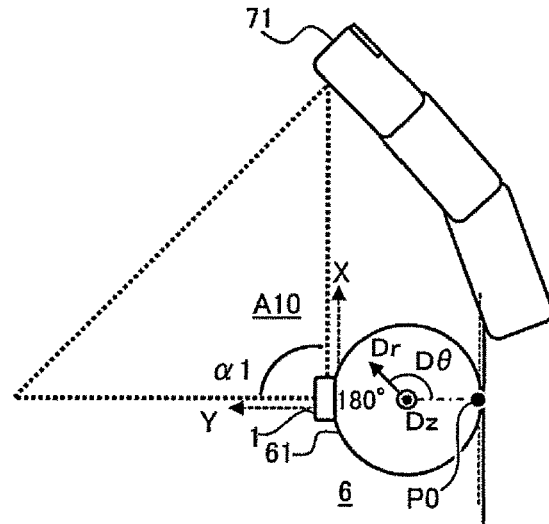
FIGS. 6A to 6C include views each illustrating a case where the diameter is smaller than that of the grip of FIGS. 4A to 4C.
Figure 6B:
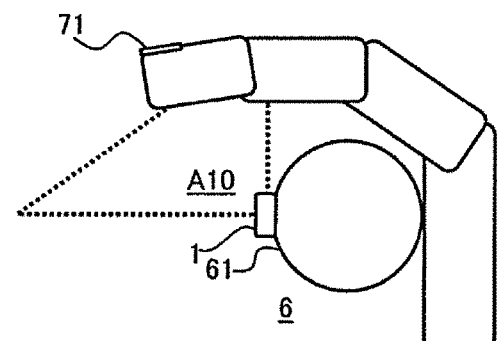
Figure 6C:
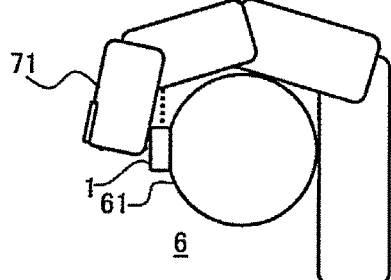

FIGS. 6A to 6C illustrate a case where the outer diameter of the grip 61 is smaller than that in FIGS. 4A to 4C. FIG. 6A illustrates a state in which the finger 71 is slightly bent in the early phase of gripping the grip 61. FIG. 6B illustrates a state in which the grip 61 is in the middle of being grabbed after the state of FIG. 6A. FIG. 6C illustrates a state in which the grip 61 is gripped after the state of FIG. 6B.

When the grip 61 has a relatively small diameter, or when the user's finger 71 is assumed to be long relative to the outer diameter of the grip 61, the attachment position of the optical sensor 1 may be set away from the reference position P0. For example, the attachment position of the optical sensor 1 in the circumferential direction Dθ may be at an angle in the vicinity of about 180°. Even in this case, the optical sensor 1 in the controller 6 can continuously detect the bending state of the finger from the initial state in which the finger 71 is slightly bent, for example.

Further, in the controller 6, from the viewpoint of including the stretched finger 71 in the detection range A10 of the optical sensor 1, the attachment position of the optical sensor 1 in the grip 61 may be at an angle of equal to or less than about 133° in the circumferential direction De, for example.

In the controller 6 of the present example embodiment, the attachment position of the optical sensor 1 is not limited to the above examples. For example, when the grip 61 has a considerably small diameter, the attachment position may be set within a range of an angle of equal to or more than about 90° and equal to or less than about 270° in the circumferential direction De. Further, in addition to the fingertips of the hand 7, the optical sensor 1 corresponding to a portion between the fingertip and the base may be arranged. Further, the optical sensor 1 may be attached to a portion in the vicinity or the like of various operators provided on the grip 61 within a range in which the finger 71 of the hand 7 gripping the grip 61 can contact the optical sensor 1. As such the optical sensor 1 may be attached to a position at an angle of equal to or less than about 90°, not particularly limited to equal to or more than about 90° in the circumferential direction De.

In the controller 6 of the present example embodiment, the shape of the grip 61 is not particularly limited to the examples of FIG. 2 and FIG. 3, and may be various substantially cylindrical shapes. For example, the cross-sectional shape of the grip 61 need not be a perfect circle. Further, for example, when the plurality of fingers 71 is used as the detection target by arranging the plurality of optical sensors 1 side by side in the longitudinal direction Dz or the like, the outer diameter of the grip 61 need not be uniform, and for example, the size of the outer diameter may vary along the longitudinal direction Dz according to the difference in length of each finger 71. In addition, the attachment position of the optical sensor 1 can be individually adjusted according to the difference in the length of the finger 71.

2. Optical Sensor

Hereinafter, a configuration example of the optical sensor 1 in the controller 6 of the present example embodiment will be described.

2-1. Overview of Optical Sensor

Figure 7:
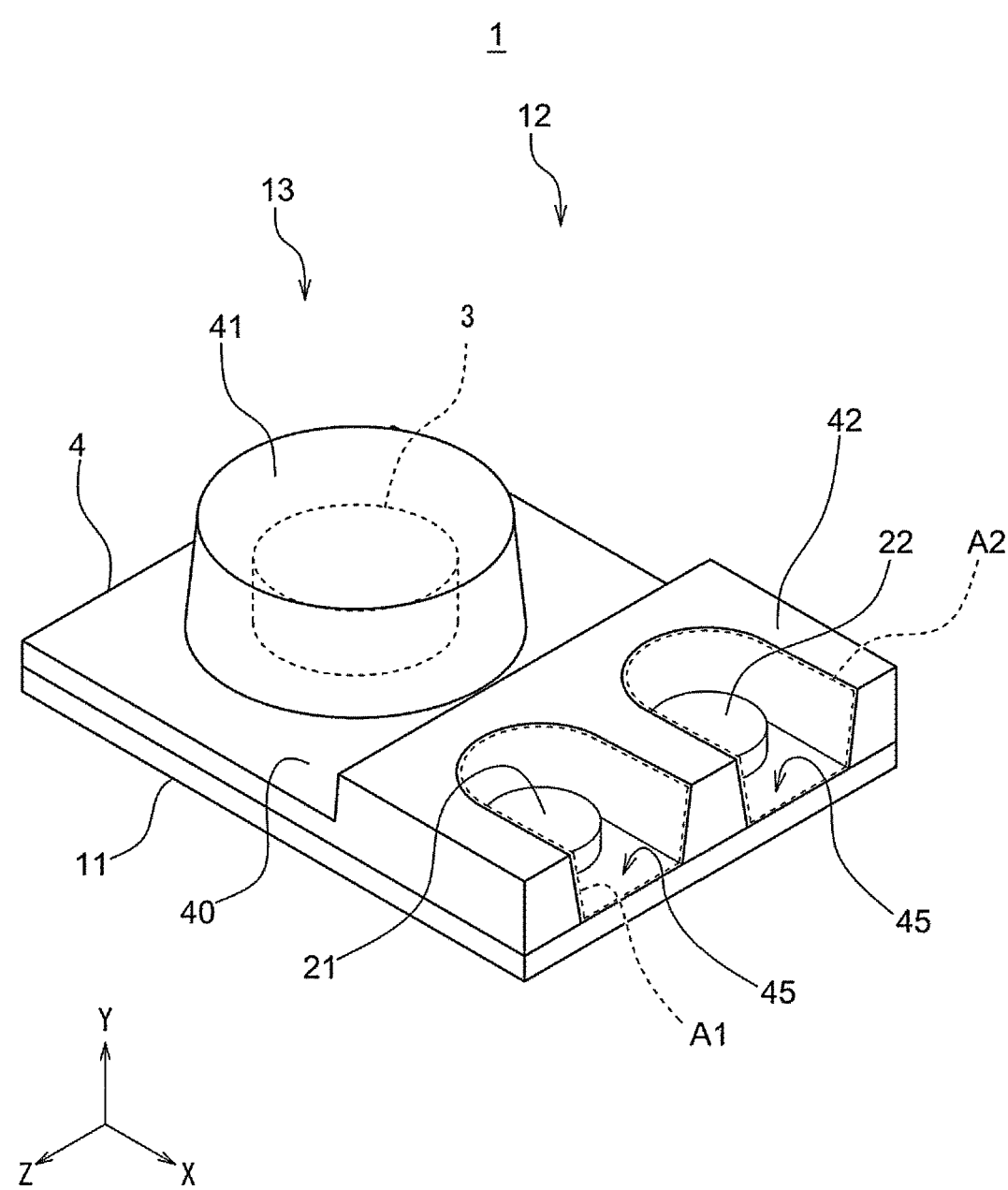
FIG. 7 is a perspective view of the optical sensor in the controller of Example Embodiment 1 of the present invention.

An outline of a configuration example of the optical sensor according to Example Embodiment 1 will be described with reference to FIG. 7. FIG. 7 is a perspective view of the optical sensor 1 in the controller 6 of the present example embodiment.

The optical sensor 1 is configured by assembling the proximity sensor 12 and the force sensor 13 so as to be arranged in the X direction on a substrate 11, for example. Hereinafter, two directions parallel to the main surface of the substrate 11 are referred to as the X direction and the Z direction, and a normal direction of the main surface is referred to as the Y direction. In addition, the +Y side on which the force sensor 13 protrudes from the substrate 11 may be referred to as an upper side, and the −Y side on the opposite side may be referred to as a lower side.

In the optical sensor 1 of the present example embodiment, the force sensor 13 includes a force sensor element 3 and a dome portion 41 including an elastic body that covers the force sensor element 3 from the upper side (+Y). The optical proximity sensor 12 includes the light emitter 21, the light receiver 22, and a wall portion 42 configured to surround the light emitter 21 and the light receiver 22. The dome portion 41 for a force sensor and the wall portion 42 for a proximity sensor are integrally formed of, for example, an elastic member 4.

In the optical sensor 1 of the present example embodiment, the proximity sensor 12 is arranged on the +X side where the finger 71 arrives, and the force sensor 13 is arranged on the opposite −X side. This makes it possible to easily detect proximity such as when the finger 71 arrives to apply a contact force to the force sensor 13. In the optical sensor 1 of the present example embodiment, the wall portion 42 for the proximity sensor is an example of a light guide that defines the above-described detection range A10 (see FIG. 3) on the +X side.

2-2. Details of Optical Sensor

Hereinafter, the optical sensor 1 according to the present example embodiment will be described in detail with reference to FIG. 7 and FIG. 8.

Figure 8:
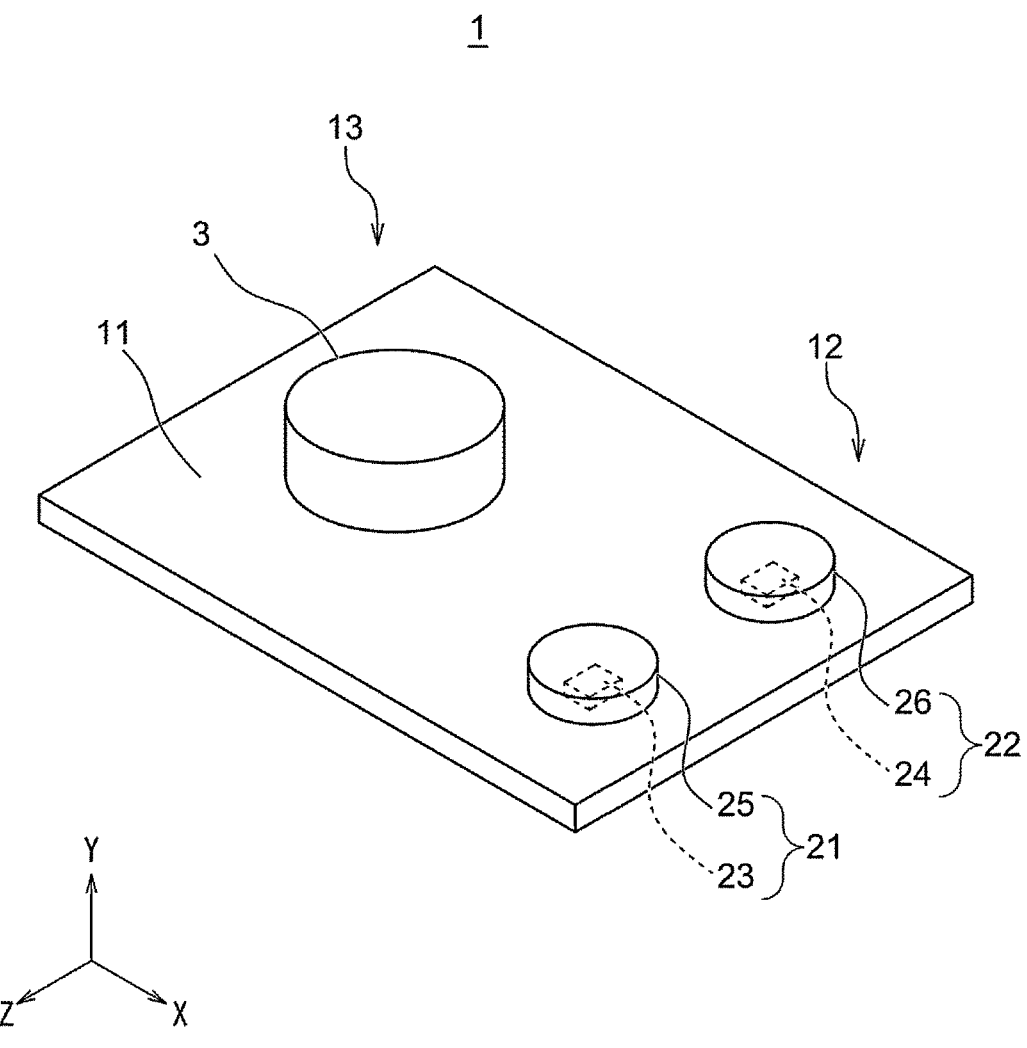
FIG. 8 is a perspective view illustrating an internal structure of the optical sensor of FIG. 7.

FIG. 8 is a perspective view illustrating the internal structure of the optical sensor 1 of FIG. 7. FIG. 8 illustrates a state in which the elastic member 4 is not provided in the optical sensor 1 illustrated in FIG. 7.

In the optical sensor 1 of the present example embodiment, for example, as illustrated in FIG. 8, the light emitter 21 and the light receiver 22 of the proximity sensor 12 are arranged side by side in the Z direction on the +X side relative to the force sensor 13 on the substrate 11 such as a rigid substrate. In the following, an example in which the position of the light emitter 21 is on the +Z side and the position of the light receiver 22 is on the −Z side on the substrate 11 will be described.

In the proximity sensor 12 of the optical sensor 1, the light emitter 21 includes a light emitting element 23 and a sealing body 25 that seals the light emitting element 23 with resin or the like, for example, as illustrated in FIG. 8.

The light emitting element 23 includes a light source element such as a light emitting diode (LED). For example, the light emitting element 23 emits light having a predetermined wavelength band such as an infrared region as the detection light. The light emitting element 23 includes a light emitting surface to emit the emitted detection light, and is arranged with the light emitting surface facing upward.

The light emitting element 23 is not limited to the LED, and may include various solid-state light source elements such as a laser diode (LD) or a vertical cavity surface emitting laser (VCSEL). The light emitting element 23 may include a plurality of light source elements. The light emitting element 23 may be provided with an optical system such as a lens and a mirror that collimate light from the light source element.

The light receiver 22 in the proximity sensor 12 receives reflected light obtained by reflecting the detection light from the light emitter 21 by the object, and detects the proximity of the object. The light receiver 22 includes, for example, as illustrated in FIG. 8, a light receiving element 24 and a sealing body 26 that seals the light receiving element 24 with resin or the like.

The light receiving element 24 includes one or a plurality of optical receivers such as a photodiode (PD), and has a light receiving surface including the optical receiver. The light receiving element 24 receives light, such as reflected light obtained by the detection light being reflected by the object, on the light receiving surface, and generates a light reception signal indicating, for example, the amount of received light as a light reception result.

The light receiving element 24 is not limited to the PD, and may include various types of optical receivers such as a phototransistor, a position sensitive device (PSD), a CMOS image sensor (CIS), or a CCD. The light receiving element 24 may be configured by a linear array or a two-dimensional array of the optical receiver. The light receiving element 24 may be provided with an optical system such as a lens for condensing the above reflected light. Further, a band pass filter or the like that blocks light in a wavelength band different from the wavelength band of the detection light may be provided on the light receiving surface of the light receiving element 24. This makes it possible to suppress the influence of disturbance light due to the external environment.

The sealing body 25 of the light emitter 21 and the sealing body 26 of the light receiver 22 each are formed by appropriately molding resin or the like having translucency with respect to the wavelength band of the detection light in the proximity sensor 12. The upper surfaces of the sealing bodies 25 and 26 respectively define the heights of the light emitter 21 and the light receiver 22, for example. Each of the sealing bodies 25 and 26 may have wavelength filter characteristics of selectively transmitting a specific wavelength band.

In the present example embodiment, the force sensor element 3 includes various sensor elements corresponding to a force detection method used in the force sensor 13. The force sensor element 3 is an example of a force sensor in the present example embodiment.

The elastic member 4 includes, for example, the dome portion 41 for a force sensor, the wall portion 42 for a proximity sensor, and a base portion 40 connected to each of the dome portion 41 and the wall portion 42. In the elastic member 4, for example, the dome portion 41 for the force sensor and the wall portion 42 for the proximity sensor are arranged so as to form a groove via the base portion 40. The dome portion 41 for the force sensor and the wall portion 42 for the proximity sensor need not be integrally formed by the elastic member 4, and may be formed as separate bodies.

The elastic member 4 is made of an elastic material such as a silicone resin. The elastic member 4 has a hardness of, for example, Shore A20 or more and A80 or less. The elastic member 4 is not particularly limited to the silicone resin, and may be formed of various elastic materials, for example, an epoxy resin.

The base portion 40 is a portion extending downward (−Y side) in the elastic member 4. The base portion 40 defines the bottom of a groove between the dome portion 41 for the force sensor and the wall portion 42 for the proximity sensor (see FIG. 3). The base portion 40 of the elastic member 4 may be omitted.

The dome portion 41 for the force sensor has a convex shape toward the upper side (+Y side) so as to cover the force sensor element 3. The dome portion 41 for the force sensor is elastically deformed in response to application of a contact force, for example, and can be restored when the contact force is removed. The convex shape of the dome portion 41 for the force sensor can be formed separately from the wall portion 42 for the proximity sensor in particular. As such, according to the shape of the dome portion 41 for the force sensor, a position of the force sensor 13 to which the contact force is applied can be uniquely defined as a position in which the dome portion 41 protrudes, and thus the force of the object can be easily detected.

The dome portion 41 for the force sensor has, for example, a tapered shape in which the outer diameter in an XZ cross section decreases as heading toward the upper side (+Y side). In FIG. 7, a truncated cone shape is illustrated as an example of the shape of the dome portion 41 for the force sensor, but the shape is not particularly limited thereto. The dome portion 41 for the force sensor may have a conical shape, a quadrangular pyramid shape, a polygonal pyramid shape, a rectangular parallelepiped shape, a semi-cylindrical shape, or the like. The inside of the dome portion 41 for the force sensor may be filled with the same elastic body as the elastic member 4 or another material.

The wall portion 42 for the proximity sensor defines an opening area A1 for light emission and an opening area A2 for light reception, for example, as illustrated in FIG. 7. The opening area A1 for light emission surrounds the periphery of the light emitter 21 so as to regulate an angular range in which light can be emitted from the light emitter 21, that is, a viewing angle (or a light distribution angle). The opening area A2 for light reception surrounds the periphery of the light receiver 22 so as to regulate the viewing angle of the light receiver 22. For example, a range common to the light distribution angle of the light emitter 21 and the viewing angle of the light receiver 22 defines the detection range A10 (FIG. 3) by the proximity sensor 12 of the optical sensor 1.

In the optical sensor 1 of the present example embodiment, the elastic member 4 defines an open end 45 on the opposite side (that is, +X side) to the force sensor 13 as illustrated in FIG. 7. The open end 45 in the present example embodiment is defined by the wall portion 42 for the proximity sensor extending except for the +X side, and defines the opening areas A1 and A2 together with the wall portion 42 for the proximity sensor. In the present example embodiment, the open end 45 is located on the +X side, and thus the opening areas A1 and A2 reach the substrate 11, that is, the height from the substrate 11 is the minimum on the +X side.

In the elastic member 4 of the present example embodiment, the viewing angle of the proximity sensor 12 is directed from the Y direction to the +X side due to the opening areas A1 and A2 having the open end 45. According to the optical sensor 1 of the present example embodiment, the detection range A10 biased to the +X side is easily realized, and for example, in a situation in which an approaching object arrives from the +X side rather than the Y direction, proximity detection of the object can be easily performed.

The center portion of the wall portion 42 for the proximity sensor extends so as to separate the light emitter 21 and the light receiver 22 from each other, and blocks light between the light emitter 21 and the light receiver 22 (see FIG. 7). This can prevent direct coupling in which the detection light emitted from the light emitter 21 is directly incident on the light receiver 22 without being reflected by the object or the like, and can suppress interference between the light emitter 21 and the light receiver 22.

In the wall portion 42 for the proximity sensor, portion on the −X side extends so as to partition the light emitter 21 and the light receiver 22 from the force sensor 13. This makes it possible to restrict the −X side of the detection range A10 of the proximity sensor 12 and suppress various kinds of interference caused by the object or the like in contact with the force sensor 13. For example, it is possible to avoid a situation in which the dome portion 41 for the force sensor deformed by the contact force comes into contact with the light emitter 21 or the light receiver 22.

In addition, in the wall portion 42 for the proximity sensor, a portion on the +Z side is positioned on the opposite side to the light receiver 22 when viewed from the light emitter 21, and a portion on the −Z side is positioned on the opposite side to the light emitter 21 when viewed from the light receiver 22. The angular width A2 of the detection range A10 in the Z direction can be set to be narrowed by the portions on the ±Z side of the wall portion 42. For example, even when there is an adjacent external light source such as other optical sensors 1 arranged in the Z direction, it is possible to suppress interference between the external light source and the proximity sensor 12 by blocking light from the external light source.

The elastic member 4 in the optical sensor 1 as described above may be configured to have different hardnesses in the dome portion 41 and the wall portion 42. For example, the elastic member 4 may be formed by two color molding using a plurality of types of materials having different hardnesses. For example, the hardness of the dome portion 41 for the force sensor may be set to be softer than the hardness of the wall portion 42 for the proximity sensor. The flexibility of the dome portion 41 for the force sensor can facilitate giving an intuitive sensory feedback of deformation according to pressing of the force sensor 13 in an application such as an HMI.

In addition, the elastic member 4 may have optical characteristics of reflecting the detection light from the light emitter 21, and may be made of a material having a reflectance of equal to or more than about 50%, for example. This makes it possible to easily guide the detection light in the proximity sensor 12.

2-3. Sensor Controller

Figure 9:
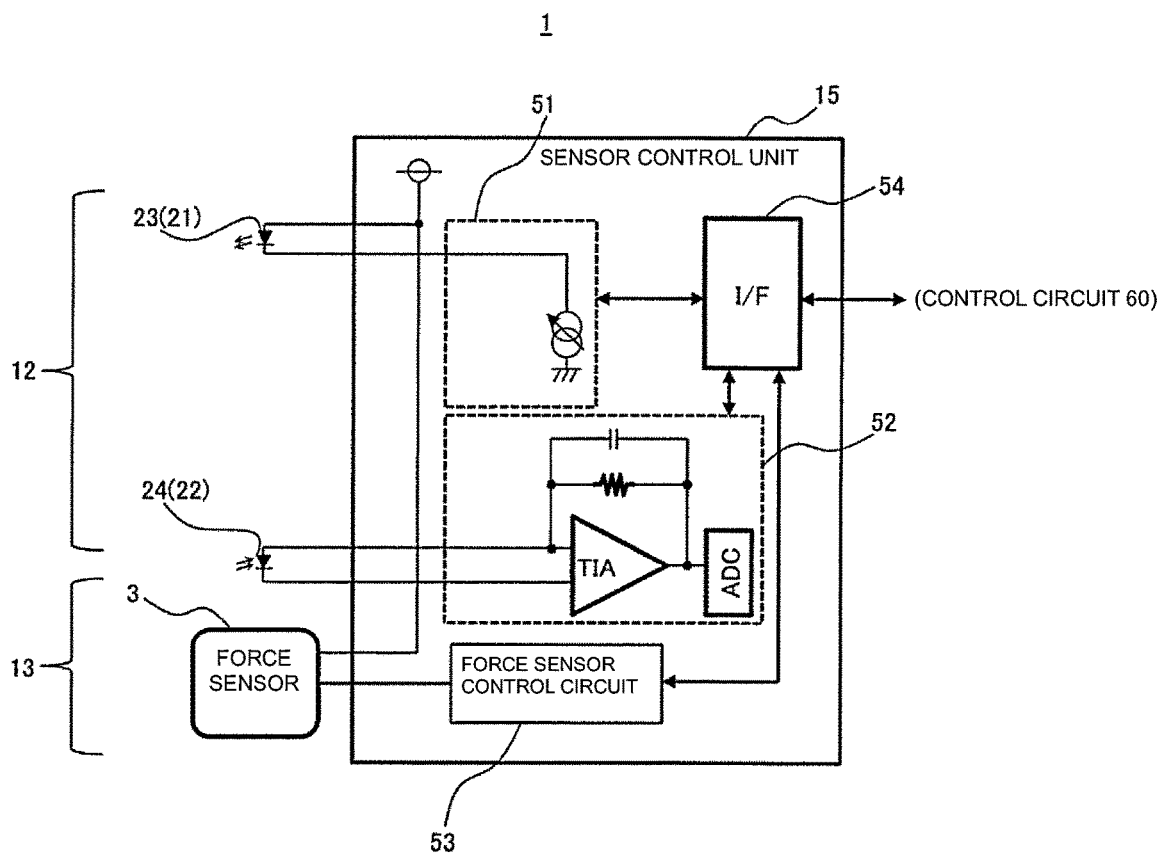
FIG. 9 is a circuit diagram illustrating the configuration of the optical sensor according to Example Embodiment 1 of the present invention.

FIG. 9 is a circuit diagram illustrating an electrical configuration of the optical sensor 1 according to the present example embodiment. The optical sensor 1 of the present example embodiment may further include a sensor controller 15 as illustrated in FIG. 9, in addition to the above-described structural configuration.

The sensor controller 15 includes, for example, a light emission control circuit 51, a light reception control circuit 52, a force sensor control circuit 53, and an interface circuit 54, as illustrated in FIG. 9.

The light emission control circuit 51 includes, for example, a light source driving portion electrically connected to the light emitting element 23. The light source driving portion supplies a driving signal to emit the detection light to the light emitting element 23. The light emission control circuit 51 may include a modulator such as an AM modulator. For example, the light emission control circuit 51 may modulate the detection light by using specific frequencies in 10 Hz to 1 MHz or the like as modulation frequencies for periodically changing the amplitudes of the light. The modulation of the detection light facilitates distinguishing the detection light and its reflected light from the ambient light.

The light reception control circuit 52 includes, for example, an amplifier electrically connected to the light receiving g element 24 and an A/D (analog/digital) converter connected to the amplifier. The light reception control circuit 52 performs various signal processing on the light reception signal output from the light receiving element 24, and outputs the signal to, for example, the interface circuit 54.

For example, the light reception control circuit 52 performs processing to detect the proximity of an object based on the reception amount of reflected light in the light reception signal. The proximity detection processing in the optical sensor 1 is not limited to the reception amount of reflected light, and may be performed based on, for example, a phase difference between the reflected light and the detection light. Further, the proximity detection processing itself need not necessarily be performed in the optical sensor 1, and may be performed by an arithmetic circuit or the like outside the optical sensor 1. The optical sensor 1 can realize proximity detection of an object such as a target object by generating a light reception signal including the reflected light of the detection light in synchronization with the driving of the light emitter 21.

The light reception control circuit 52 may perform filtering such as a band pass filter that passes a signal component including a modulation frequency of the detection light, or may perform synchronous detection in synchronization with the light emission control circuit 51. For example, the light reception control circuit 52 can analyze the above reflected light by being separated from the ambient light by blocking a steady DC component. The modulation frequency of the detection light can be appropriately set, avoiding frequencies used in existing external systems, such as about 38 kHz used as carriers of an infrared remote controller. This makes it possible to suppress a malfunction of the optical sensor 1 caused by the external system.

The force sensor control circuit 53 includes a control circuit that controls the driving of various sensor elements of the force sensor element 3 in the force sensor 13, an amplifier for an output signal from the sensor element, and the like. The force sensor control circuit 53 may include a circuit configuration to generate a force detection signal indicating a detection result of force in multiple axes based on the above output signal, for example. The force sensor control circuit 53 is not limited to the multiple axes, and may output a force detection signal of the detection result of force in one axis.

For example, when the force detection method is a piezoelectric method, the piezoelectric effects of one or more piezoelectric elements arranged on the substrate in the force sensor 13 are used, stress generated in the force sensor 13 due to contact with the object (FIG. 7) is converted into charge by the piezoelectric element, and force is sensed from a change in the charge. In the case of the optical method, one or more light emitting elements and one or more light receiving elements arranged on the substrate in the force sensor 13 are used, and a change in the distribution of reflected light in the force sensor 13 caused by deformation due to contact with the object is read by the light receiving element to perform force sensing.

The strain resistance method uses one or more strain gauges arranged on the substrate in the force sensor 13, and detects, as a resistance change, a strain transmitted to the strain gauge via the inside of the force sensor 13 due to deformation caused by contact of the object, and performs force sensing using the change. The capacitive method uses one or more capacitive sensing electrodes on the substrate in the force sensor 13, and performs force sensing from a change in coupling capacitance between a reference potential and the capacitive sensing electrode, which changes due to deformation of the force sensor 13 caused by contact of the object. Note that in each method, it is possible to increase the number of axes of force sensing by using a plurality of various sensor elements such as a piezoelectric element, a light emitting/receiving element, a strain gauge, and a capacitive sensing electrode, which are included in the force sensor 13.

The interface circuit 54 is connected to the light emission control circuit 51, the light reception control circuit 52, and the force sensor control circuit 53. The interface circuit 54 connects the optical sensor 1 to an external device to input and output various signals.

Note that the configuration described above is an example, and the optical sensor 1 is not particularly limited to the configuration described above. For example, in the optical sensor 1 of the present example embodiment, any of the circuits 51 to 54 of the sensor controller 15 may be configured externally, or may be provided as a module separate from the circuits 51 to 54 of the sensor controller 15. Further, a portion or an entirety of the functions of the sensor controller 15 may be incorporated in the control circuit 60 of the controller 6.

3. Summary

As described above, the controller 6 in the present example embodiment is an example of a user interface device to be gripped by the user with the hand 7. The controller 6 includes the grip 61 having dimensions in the radial direction Dr and the circumferential direction Dθ and extending in the longitudinal direction Dz, and at least one optical sensor 1 provided at the grip 61. The optical sensor 1 includes the proximity sensor 12 including the light emitter 23 and the light receiver 24, and the force sensor 13 to detect a contact force by an object such as the finger 71 of the hand 7. The proximity sensor 12 emits light from the light emitter 23 in the predetermined detection range A10 around the force sensor 13, and detects a state in which an object is in proximity to the force sensor 13 in accordance with a light reception result obtained by light incident from the detection range A10 to be received by the light receiver 24. The detection range A10 is set to be biased to the +X side, which is one side of both sides in the circumferential direction De, toward the outside in the radial direction Dr from the position of the force sensor 13 in the grip 61, and is set to be a range wider in the circumferential direction Dθ than in the longitudinal direction Dz.

According to the controller 6 described above, since the detection range A10 of the proximity sensor 12 of the optical sensor 1 is set to be biased to the +X side and to be wider in the circumferential direction Dθ than in the longitudinal direction Dz, the state of the object such as the finger 71 approaching the optical sensor 1 from the +X side is easily detected. This makes it easy to detect the state of being gripped by the user using the optical sensor 1.

In the present example embodiment, the controller 6 includes the plurality of optical sensors 1 located at positions different from each other in the longitudinal direction Dz. The detection range A10 of each of the optical sensors 1 has a first angular width α1 in the circumferential direction Dθ and a second angular width α2 smaller than the first angular width α1 in the longitudinal direction Dz. This makes it easy to suppress erroneous detection such as interference between the plurality of optical sensors 1. For example, it is possible to easily suppress erroneous detection in a case where the plurality of fingers 71 of the hand 7 is set as detection targets of the different optical sensors 1.

In the controller 6 of the present example embodiment, the force sensor 13 and the proximity sensor 12 are arranged side by side adjacent to each other in the circumferential direction De in the optical sensor 1. The detection range A10 of the proximity sensor 12 is biased to the side opposite to the force sensor 13 in the circumferential direction De. This makes it easy for the proximity sensor 12 to detect the process of the arrival of the object such as the finger 71 that is intended to apply the contact force to the force sensor 13.

In the controller 6 of the present example embodiment, the optical sensor 1 is arranged at a position where the finger 71 of the hand 7 can contact with the optical sensor 1 in a state in which the grip 61 is gripped by the hand 7. This makes it easy for the optical sensor 1 to detect various operations performed by the finger 71 of the hand 7 when the user of the controller 6 grips the grip 61.

In the controller 6 of the present example embodiment, the proximity sensor 12 further includes the wall portion 42, as an example of a light guide, which surrounds the light emitter 23 so as to guide the light emitted by the light emitter 23 to the detection range A10 and/or surrounds the light receiver 24 so as to guide the light incident from the detection range A10 to the light receiver 24. As such, the wall portion 42 of the optical sensor 1 can easily realize the directivity of the detection range A10 of the proximity sensor 12.

Example Embodiment 2

In Example Embodiment 1, the controller 6 in which the directivity corresponding to the detection range A10 of the optical sensor 1 is set by the wall portion 42 for the proximity sensor has been described. In Example Embodiment 2, an example in which a sealing resin of an optical sensor is used to set the above directivity will be described with reference to FIG. 10 and FIG. 11.

Figure 10:
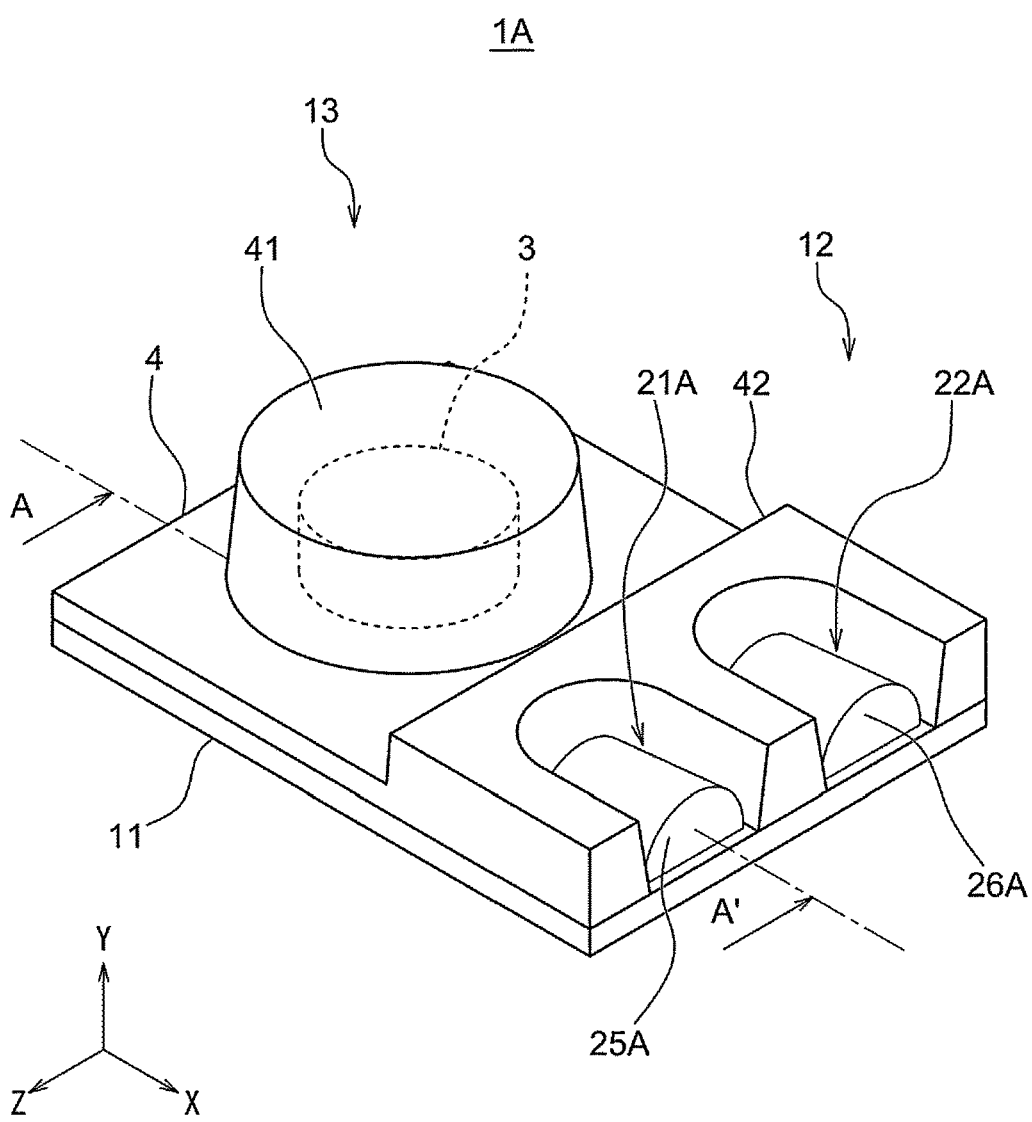
FIG. 10 is a perspective view illustrating the configuration of an optical sensor according to Example Embodiment 2 of the present invention.
Figure 11:
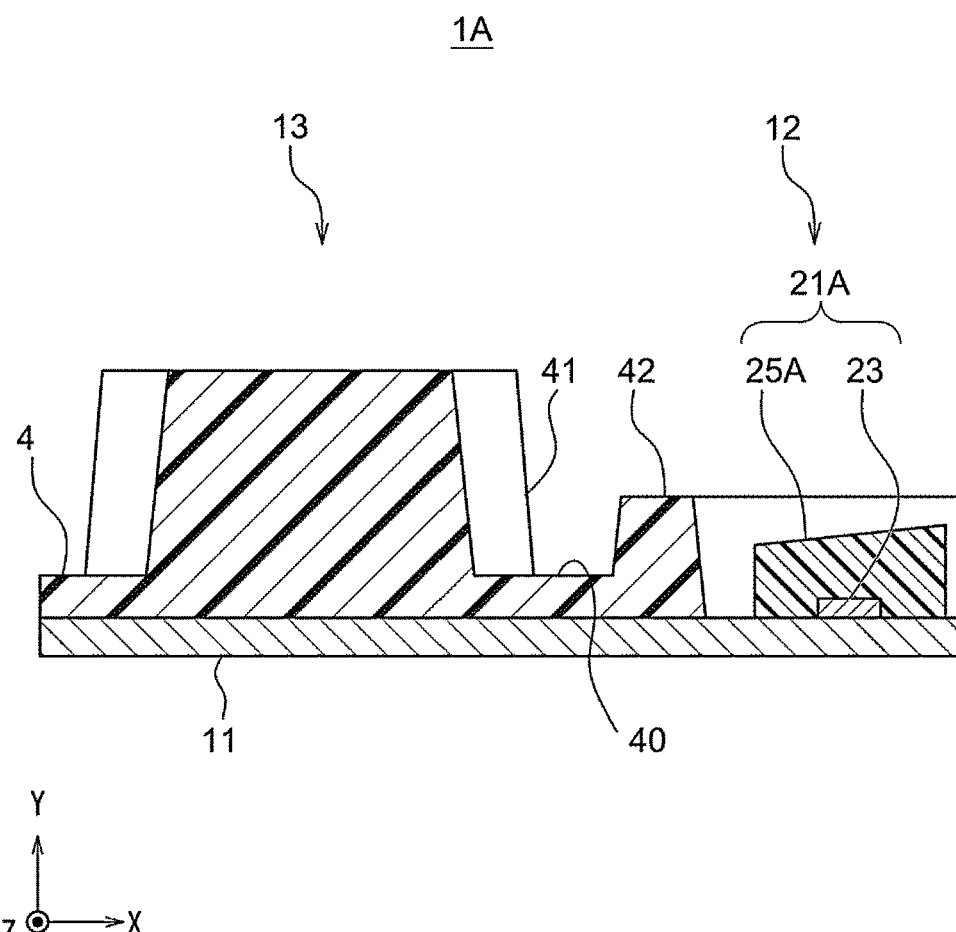
FIG. 11 is a cross-sectional view of the optical sensor of FIG. 10.

FIG. 10 illustrates the configuration of an optical sensor 1A in Example Embodiment 2. FIG. 11 is a cross-sectional view of the optical sensor 1A taken along line A-A' in FIG. 10.

The optical sensor 1A of the present example embodiment is provided at the controller 6 of the present example embodiment instead of the optical sensor 1 of Example Embodiment 1. The optical sensor 1A of the present example embodiment is configured by changing the shapes of sealing bodies 25A and 26A of a light emitter 21A and a light receiver 22A from the same configuration as the optical sensor 1 of Example Embodiment 1, for example, as illustrated in FIG. 10. In the present example embodiment, the sealing bodies 25A and 26A are examples of first and second translucent members, respectively.

In the present example embodiment, the sealing body 25A of the light emitter 21A has such a lens shape that refracts the detection light emitted from the light emitting element 23 (FIG. 11) from a Y direction toward a +X side. For example, the sealing body 25A is inclined on the upper side toward the +X side in an XY cross section as illustrated in FIG. 11. According to such a lens shape, for example, the directivity such as the light distribution angle of the light emitter 21A can be biased to the +X side. The inclination of the sealing body 25A is not limited to a linear shape and may be a curved shape, and for example, may be a convex shape toward the +Y side.

Further, the sealing body 25A may have a light condensing function of narrowing the light distribution angle of the light flux emitted to the +X side in a Z direction. The sealing body 25A can be realized in a curved surface shape having a curvature in a YZ cross section as illustrated in FIG. 10, for example. For example, the sealing body 25A has a larger curvature in the Z direction than in an X direction. In addition, the sealing body 25A is not particularly limited to a symmetrical shape as long as the sealing body 25A has a curvature on the +X side where the finger 71 arrives, and may be configured in various shapes.

In addition, the sealing body 26A of the light receiver 22A can be configured similarly to the sealing body 25A of the light emitter 21A, for example. Note that both the sealing body 25A of the light emitter 21A and the sealing body 26A of the light receiver 22A do not have to have a lens shape as described above, and either one of them may have a lens shape.

According to the lens shapes of the sealing bodies 25A and 26A of the light emitter 21A and the light receiver 22A as described above, it is possible to improve the flexibility of the directivity control of the proximity sensor 12 in the optical sensor 1A. Therefore, it is possible to set appropriate directivity as a configurable in accordance with various applications to which the optical sensor 1A is used.

As described above, in the controller 6 of the optical sensor 1A of the present example embodiment, the proximity sensor 12 of the optical sensor 1A further includes at least one of the sealing body 25A which is an example of the first translucent member and the sealing body 26A which is an example of the second translucent member. The sealing body 25A seals the light emitting element 23 so as to guide the light emitted by the light emitting element 23 to the detection range A10. The sealing body 26A seals the light receiving element 24 so as to guide light incident from the detection range A10 to the light receiving element 24. According to the optical sensor 1A, the directivity of the proximity sensor 12 can be easily controlled also in consideration of force detection by using the sealing bodies 25A and 26A.

Example Embodiment 3

In Example Embodiments 1 and 2, the controller 6 that controls the directivity by the configuration of the optical sensor 1 has been described. In Example Embodiment 3, a controller that controls the directivity by a cover for the optical sensor 1 will be described with reference to FIG. 12 to FIG. 17.

Figure 12:
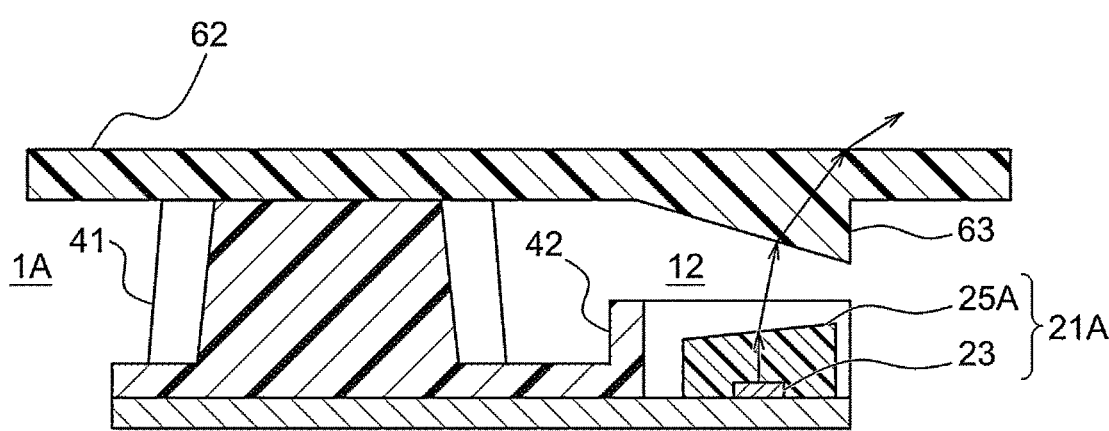
FIG. 12 is a cross-sectional view illustrating the configuration of a controller according to Example Embodiment 3 of the present invention.
Figure 12:
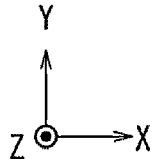
Figure 13:
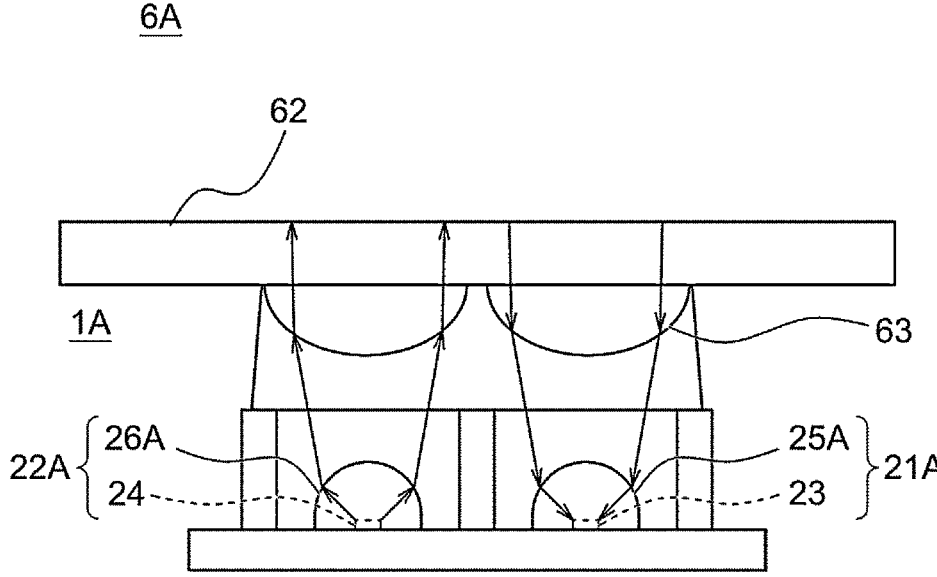
FIG. 13 is a side view of an optical sensor in the controller of Example Embodiment 3 of the present invention.
Figure 13:
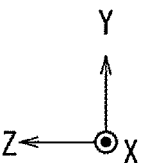

FIG. 12 is a cross-sectional view illustrating the configuration of a controller 6A according to the present example embodiment. The cross section of FIG. 12 corresponds to an A-A' cross section of Example Embodiment 2. FIG. 13 is a side view of the optical sensor 1A in the controller 6A of the present example embodiment as viewed from a +X side.

In the controller 6A of the present example embodiment, for example, in the same configuration as that of Example Embodiment 2, a cover 62 covering the optical sensor 1A includes a structure 63 to control the directivity of detection light. The cover 62 may be any of various members that cover the optical sensor 1A, and may be configured integrally with the grip 61, for example. In the controller 6A of the present example embodiment, the optical sensor 1A is arranged so as to be in contact with the cover 62 on the upper surface of the dome portion 41 for the force sensor, for example.

The cover 62 is made of a translucent material that is transparent to the wavelengths of the detection light emitted from the light emitting element 23 of the proximity sensor 12 in the optical sensor 1A and has a refraction index larger than that of air. For example, the cover 62 can be made of optical glasses such as BK7, plastics such as polycarbonate and acrylic, silicone, or the like.

In the example of FIG. 12, the cover 62 includes a structure 63 defined by a portion cut so as to be inclined downwardly toward the +X side in the vicinity of the upper side of the proximity sensor 12. According to the structure 63 of the cover 62, the optical path of the detection light by the proximity sensor 12 is bent toward the +X side where the finger 71 arrives at the optical sensor 1A in the controller 6A, and the detection range A10 is easily inclined to the +X side.

In addition, in the example of FIG. 13, the structure 63 of the cover has a lens shape having a curvature so as to narrow the directivity of light in a Z direction orthogonal to an X direction in which the finger 71 moves, above each of the light emitter 21A and the light receiver 22A. The structure 63 of the cover 62 may be provided only above one of the light emitter 21A and the light receiver 22A.

As described above, the controller 6A of the present example embodiment further includes the cover 62. The cover 62 covers the optical sensor 1A so as to guide the light emitted by the light emitting element 23 in the optical sensor 1A to the detection range A10 and/or guide the light incident from the detection range A10 to the light receiving element 24. The cover 62 can also easily realize the directivity of the detection range A10 of the optical sensor 1A by the proximity sensor 12.

Modification of Example Embodiment 3

In the controller 6A of the present example embodiment, the structure to control the directivity of the detection light by the cover 62 is not particularly limited to the above example, and various structures may be adopted.

For example, the structure 63 of the cover 62 is not limited to the example of FIG. 12, and may have a thickness larger than that on a −X side, on the +X side from the vicinity of the upper side of the proximity sensor 12, or may have a shape in which the inclination is further extended. Further, the structure 63 of the cover 62 may be provided for one of the light emitter 21A and the light receiver 22A.

Figure 14:
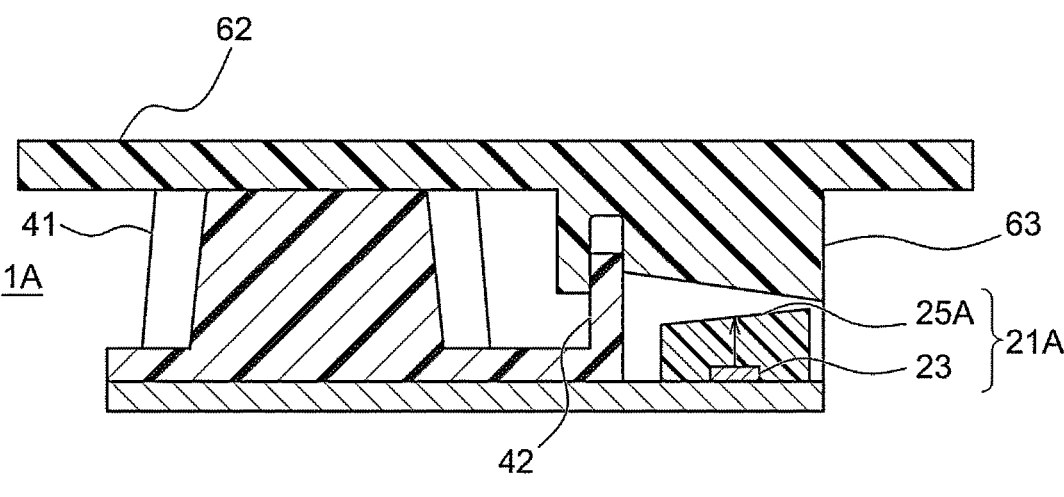
FIG. 14 is a cross-sectional view illustrating the configuration of a controller according to Modification 1 of Example Embodiment 3 of the present invention.
Figure 15:
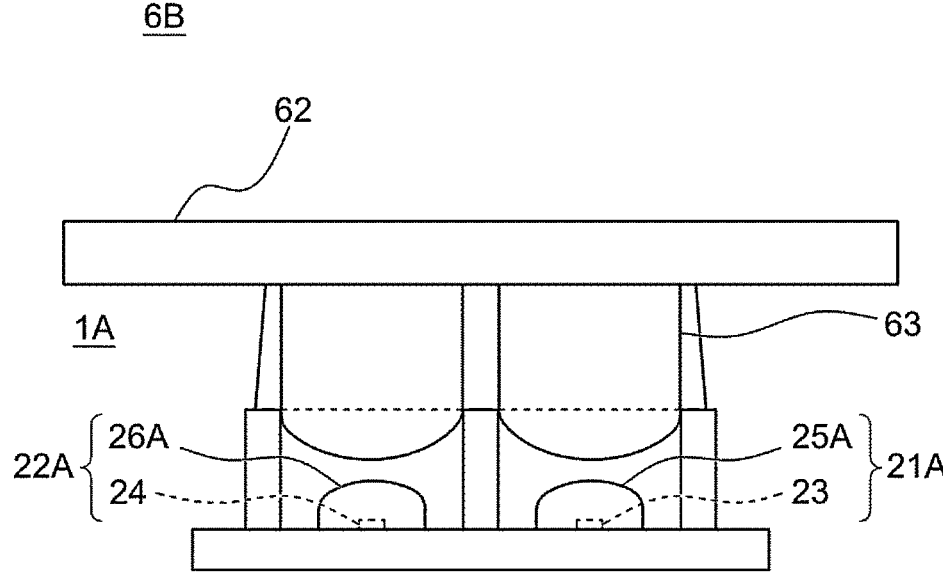
FIG. 15 is a side view of an optical sensor in the controller of Modification 1 of Example Embodiment 3 of the present invention.
Figure 15:
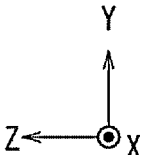

FIG. 14 is a cross-sectional view illustrating the configuration of a controller 6B according to Modification 1 of Example Embodiment 3. FIG. 15 is a side view of the optical sensor 1A in the controller 6B of the present modification. In the controller 6B of the present modification, the structure 63 of the cover 62 may be configured in a shape that engages with the elastic member 4 of the optical sensor 1A.

For example, as illustrated in FIG. 14, according to the shape in which the structure 63 sandwiches the wall portion 42 of the proximity sensor 12, the positional deviation in the X direction can be regulated. In addition, as illustrated in FIG. 15, the inner diameters of the convex lens shapes of the structures 63 are set to be minor diameters that are fitted to the opening areas A1 and A2 of the proximity sensor 12, and thus it is possible to suppress the movement of the cover 62 in a YZ plane. According to such a configuration, the structure 63 of the cover 62 functions as a positioning portion for the optical sensor 1, and it is possible to eliminate the need to provide a separate positioning mechanism.

Figure 16:
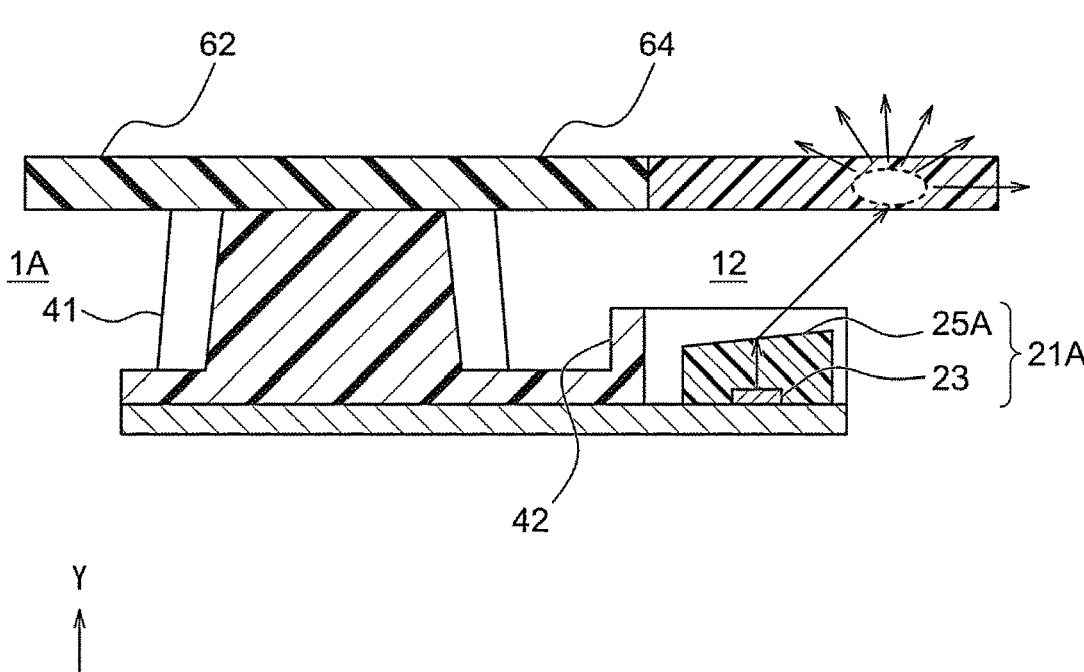
FIG. 16 is a cross-sectional view illustrating the configuration of a controller according to Modification 2 of Example Embodiment 3 of the present invention.

FIG. 16 is a cross-sectional view illustrating the configuration of a controller 6C according to Modification 2 of Example Embodiment 3. In the controller 6C of the present modification, the cover 62 includes a light diffusion portion 64 which is a portion functioning as a diffuser plate above the light emitter 21A in the optical sensor 1A. The light diffusion portion 64 diffuses the detection light generated in the light emitter 21A of the optical sensor 1 when the detection light passes through the light diffusion portion 64, and thus the detection light can be easily distributed in a wide range diffusively in the wide detection range A10.

The light diffusion portion 64 can be realized by, for example, etching (holographic diffuser) the surface of a corresponding portion of the cover 62. Alternatively, the light diffusion portion 64 may be realized by adding a reflective filler to resin forming the cover 62 (white diffusion glass), or by sandblasting (ground glass) or the like.

As described above, in the controller 6C of the present example embodiment, the cover 62 may include the light diffusion portion 64 that diffuses the light emitted by the light emitting element 23 and guides the light to the detection range A10. This makes it easy to widely distribute the detection light of the optical sensor 1A in the detection range A10.

Figure 17:
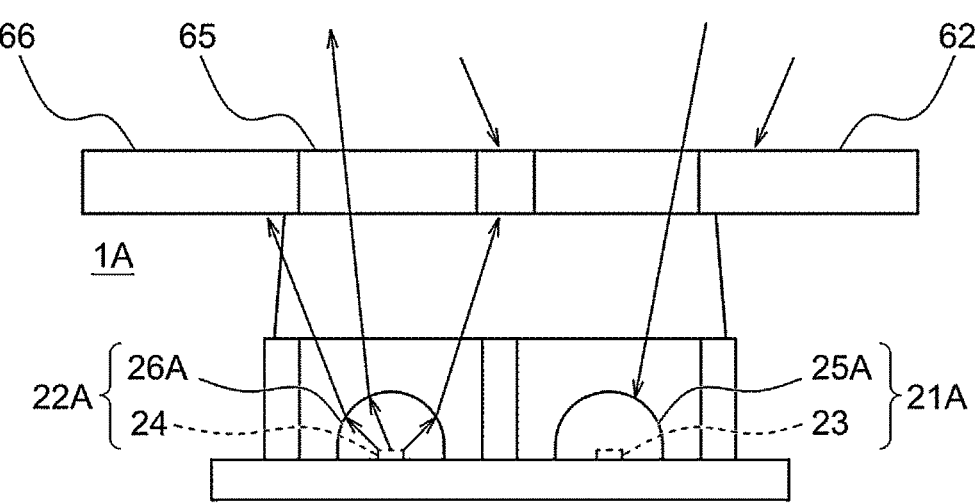
FIG. 17 is a side view illustrating a configuration of a controller according to Modification 3 of Example Embodiment 3 of the present invention.

FIG. 17 is a side view illustrating the configuration of a controller 6D according to Modification 3 of Example Embodiment 3. In the controller 6D of the present modification, the cover 62 includes a transparent portion 65 that transmits the detection light from the proximity sensor 12 and a light shielding portion 66 that does not transmit the detection light. The transparent portion 65 is provided, for example, above the light emitter 21A and above the light receiver 22A.

The light shielding portion 66 is provided so as to define a slit-shaped transmission region as the transparent portion 65 in the cover 62, and shields light in the wavelength band of the detection light outside the transmission region. The transmission region has, for example, a relatively narrow width in the Z direction and a relatively wide width in the X direction. The light shielding portion 66 may define the transmission region of one of the light emitter 21A and the light receiver 22A.

The light shielding portion 66 of the cover 62 is realized by adding an absorptive filler to the resin forming the cover 62, applying an absorptive coating material to the surface of the cover 62, adhering, or the like. According to the cover 62 of the present example embodiment, the detection range A10 is easily regulated, and for example, it is possible to easily suppress erroneous detection between the plurality of optical sensors 1 or the plurality of fingers by the transmission region which is narrow in the Z direction.

As described above, in the controller 6D of the present example embodiment, the cover 62 may include the light shielding portion 66 that shields the light emitted from the light emitting element 23 to the outside of the detection range A10 and shields the light incident on the light receiving element 24 from the outside of the detection range A10. This makes it easy to regulate the detection range A10 of the optical sensor 1A.

Example Embodiment 4

In Example Embodiment 4, an example in which the optical method is adopted as a force detection method of an optical sensor in a controller will be described with reference to FIG. 18 to FIG. 20.

Figure 18:
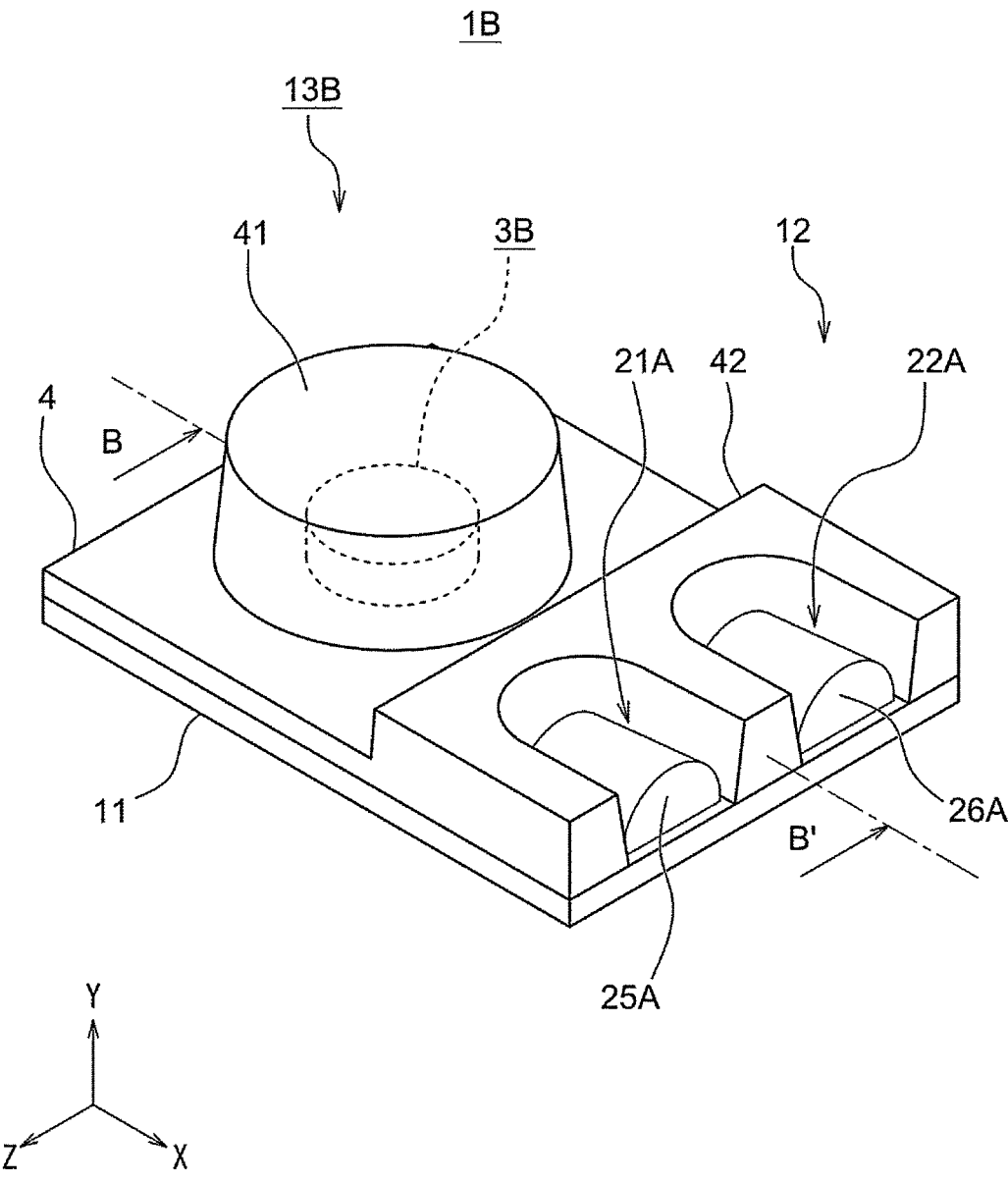
FIG. 18 is a perspective view of an optical sensor according to Example Embodiment 4 of the present invention.
Figure 19:
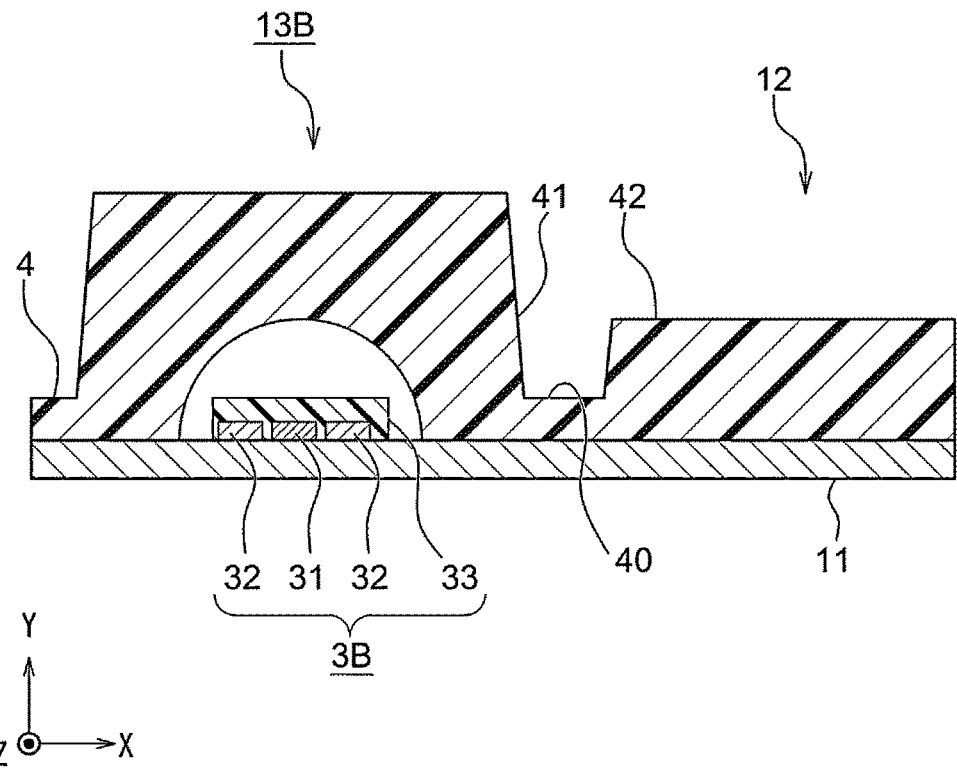
FIG. 19 is a cross-sectional view of the optical sensor of FIG. 18.

FIG. 18 is a perspective view of an optical sensor 1B in Example Embodiment 4. FIG. 19 is a cross-sectional view of the optical sensor 1B taken along line B-B' in FIG. 18. The B-B' cross section is a cross section passing through a force sensor 13B along an XY plane.

In the optical sensor 1B of the present example embodiment, for example, in the same configuration as the optical sensor 1A of Example Embodiment 2, the force sensor 13B is configured by the optical method. The optical force sensor 13B includes, for example, as illustrated in FIG. 19, a light emitting element 31 and a light receiving element 32 as a force sensor element 3B. The light emitting element 31 and the light receiving element 32 may be sealed by a sealing body 33 made of, for example, a transparent resin.

Further, in the optical force sensor 13B, the inside of the dome portion 41 for the force sensor may have a hollow structure or may be filled with, for example, a transparent plastic more flexible than the sealing body 33. In addition, the inside of the dome portion 41 is configured to be able to reflect light from the light emitting element 31, for example.

In the optical force sensor 13B, the light emitting element 31 includes a light emitting source such as a single or multi-emitter VCSEL. For example, the light emitting element 31 emits light having a predetermined wavelength band such as an infrared region, and emits the light as detection light for force detection. The light emitting element 31 is not limited to the VCSEL, and may include various solid-state light source elements such as an LD or an LED. The light emitting element 31 may include a plurality of light source elements. The light emitting element 31 may be provided with an optical system such as a lens and a mirror that collimate light from the light emitting element.

The light receiving element 32 includes an optical receiver such as a PD, and is configured by arranging a plurality of optical receivers so as to surround the periphery of the light emitting element 31, for example. The light receiving element 32 receives light such as reflected light of the detection light in the optical receiver and generates a light reception signal indicating, for example, the amount of received light as a light reception result. The light receiving element 32 is not limited to the PD, and may include various types of optical receivers such as a phototransistor, a PSD, a CIS, or a CCD.

The dome portion 41 for the force sensor includes, for example, an elastic member having a light shielding property with respect to the frequency band of the detection light from the light emitting element 31.

The optical force sensor 13B configured as described above detects the contact force of the object by using the fact that the receiving state of the reflected light by the light receiving element 32 is changed according to force from the object in contact, the detection light emitted from the light emitting element 31 being reflected by a reflector 35. As a method of measuring the contact force in the optical method, a known technique can be appropriately applied.

According to the optical force sensor 13B, it can be collectively formed by using the same manufacturing process as that of the proximity sensor 12, and thus, the manufacturing of the optical sensor 1B can be facilitated. For example, the sealing bodies 25A and 26A in the proximity sensor 12 and the sealing body 33 of the light emitting element 31 and the light receiving element 32 in the force sensor 13B may be formed in the same process.

Figure 20:
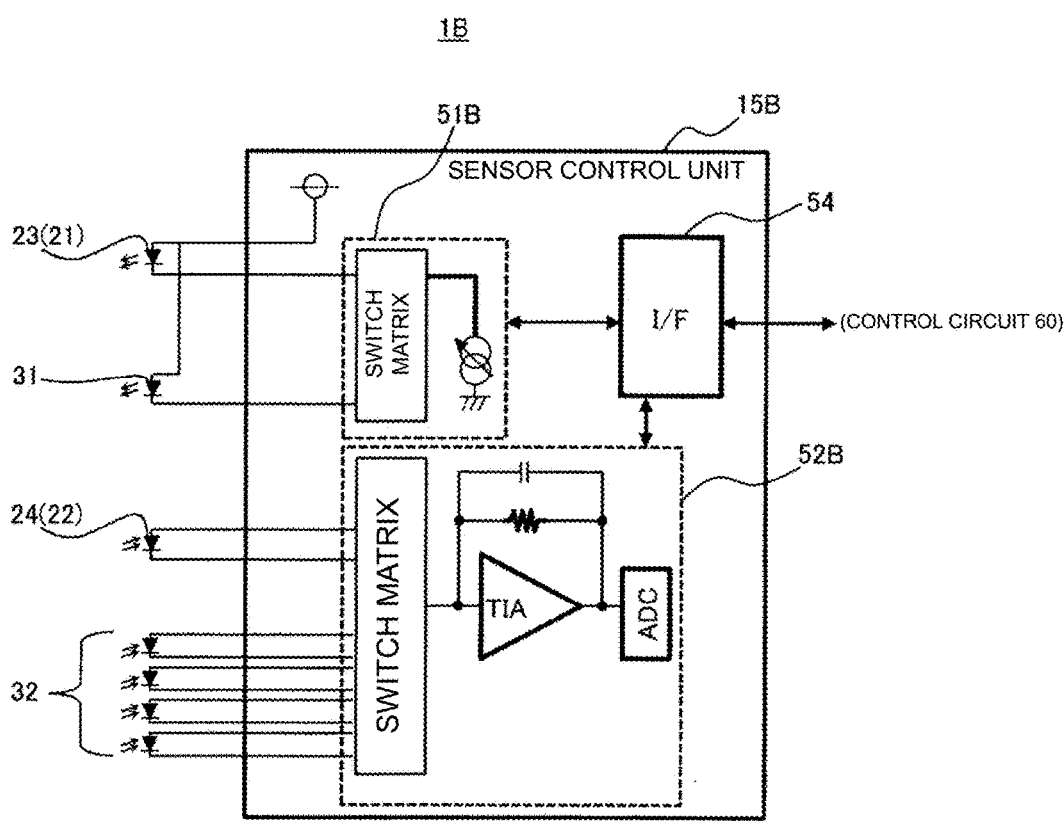
FIG. 20 is a circuit diagram illustrating the configuration of the optical sensor according to Example Embodiment 4 of the present invention.

FIG. 20 is a circuit diagram illustrating an electrical configuration of the optical sensor 1B according to Example Embodiment 4. In Example Embodiment 1, in the sensor controller 15 of the optical sensor 1, the force sensor control circuit 53 is configured separately from the light emission control circuit 51 and the light reception control circuit 52 to control the proximity sensor 12. A sensor controller 15B of the optical sensor 1B of the present example embodiment has the same configuration as that of Example Embodiment 1, but instead of the separate force sensor control circuit 53 (FIG. 9), the control function of the force sensor 13B is provided to a light emission control circuit 51B and a light reception control circuit 52B of the proximity sensor 12.

For example, as illustrated in FIG. 20, the light emission control circuit 51B of the present example embodiment is configured to include, for example, a switch matrix or the like so as to control the light emitting element 23 of the proximity sensor 12 and the light emitting element 31 of the force sensor 13B. Further, the light reception control circuit 52B of the present example embodiment is configured to include, for example, a switch matrix or the like so as to control the light receiving element 24 of the proximity sensor 12 and the light receiving element 32 of the force sensor 13B. This allows the control functions of both the proximity sensor 12 and the force sensor 13B to be configured by the same circuit technology, which can reduce the number of components of the optical sensor 1B and facilitate the integration of the circuit.

For example, the sensor controller 15B of the optical sensor 1B of the present example embodiment can be configured by a single IC or the like that is shared by the control function of the proximity sensor 12 and the control function of the force sensor 13B. As described above, the optical sensor 1B of the present example embodiment can be reduced in size and cost.

As described above, in the optical sensor 1B of the present example embodiment, the optical force sensor 13B includes, as the force sensor element 3B, the light emitting element 31 different from the light emitting element 23 of the proximity sensor 12 and the light receiving element 32 different from the light receiving element 24 of the proximity sensor 12. The sensor controller 15B of the optical sensor 1B includes the light emission control circuit 51B that controls the light emitter 21 of the proximity sensor 12 and the light emitting element 31 of the force sensor 13B, and the light reception control circuit 52B that controls the light receiver 22 of the proximity sensor 12 and the light receiving element 32 of the force sensor 13B. By optically configuring the proximity sensor 12 and the force sensor 13B of the optical sensor 1B, the manufacturing of the sensor structure is facilitated, in addition, the circuit configuration can be simplified, and the manufacturing of the optical sensor 1B can be facilitated.

Other Example Embodiments

In the above example embodiments, the optical sensor 1 in which the wall portion 42 for the proximity sensor has the open end 45 has been described. In the present example embodiment, the wall portion 42 for the proximity sensor need not have the open end 45, and may surround the entire circumference of the light emitter 21 and the light receiver

22. Even in such a case, the detection range A10 can be set to be inclined by a means different from the open end 45. Such a modification will be described with reference to FIG. 21.

Figure 21:
FIG. 21 is a cross-sectional view illustrating modification of an optical sensor in the controller.
Figure 21:
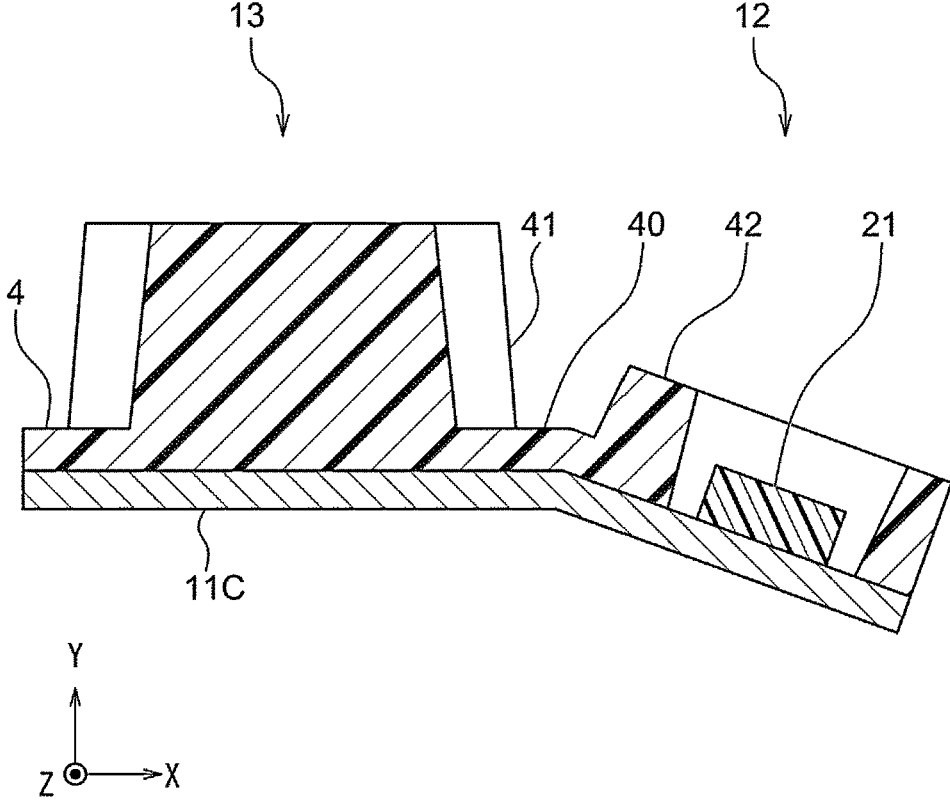

FIG. 21 is a cross-sectional view illustrating a modification of an optical sensor 1C in a controller. The optical sensor 1C of the present modification example includes a flexible substrate 11C in the same configuration as that of the optical sensor 1 of Example Embodiment 1 described above, for example.

In the optical sensor 1C of the present modification, the substrate 11C is, for example, a flexible substrate or a rigid flexible substrate. The substrate 11C is configured to be bendable at a portion or the like corresponding to a groove between the dome portion 41 for the force sensor and the wall portion 42 for the proximity sensor. In addition, in the present modification, the elastic member 4 also has a hardness that allows bending at least at the base portion 40 corresponding to the above groove.

According to the optical sensor 1C, as illustrated in FIG. 21, the direction of the detection range A10 of the proximity sensor 12 can be inclined to a +X side or the like with respect to the force sensor 13, for example, by bending the substrate 11C. Thus, for example, in a situation where an object to approach the force sensor 13 arrives from the +X side, the proximity sensor 12 can easily detect the approaching state before the object comes into contact with the force sensor 13.

As described above, in the optical sensor 1C of the present example embodiment, the substrate 11C may have flexibility at least at a position between the dome portion 41 for the force sensor and the wall portion 42 for the proximity sensor in the elastic member 4. This makes it possible to change the direction of viewing angle of the proximity sensor 12 with respect to the arrangement of the force sensor 13, and to easily achieve both force detection and proximity detection.

Alternatively, in the optical sensor 1 of the present example embodiment, the wall portion 42 for the proximity sensor may be configured to have a height lower than other portions on the +X side. This also makes it possible to set the detection range A10 of the optical sensor 1 to be inclined to the +X side. Further, in the optical sensor 1 of the present example embodiment, the wall portion 42 may be configured to surround one of the light emitter 21 and the light receiver 22, or may be omitted.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A user interface device to be gripped by a user, the user interface device comprising:

a grip including dimensions in a radial direction and a circumferential direction and extending in a longitudinal direction; and at least one optical sensor provided at the grip and including:

a proximity sensor including a light emitter and a light receiver; and a force sensor to detect a contact force by an object;

the proximity sensor is operable to emit light from the light emitter to a predetermined detection range around the force sensor, and detect a state in which the object is in proximity to the force sensor in accordance with a light reception result obtained by light incident from the detection range to be received by the light receiver; and the detection range is biased to one side in the circumferential direction from a position of the force sensor in the grip toward an outer side portion in the radial direction, and is wider in the circumferential direction than in the longitudinal direction.

2. The user interface device according to claim 1, further comprising:

a plurality of the optical sensors at positions different from each other in the longitudinal direction; and the detection range of each of the plurality of the optical sensor has a first angular width in the circumferential direction and a second angular width smaller than the first angular width in the longitudinal direction.

3. The user interface device according to claim 1, wherein in the at least one optical sensor, the force sensor and the proximity sensor are side by side and adjacent to each other in the circumferential direction; and the detection range of the proximity sensor is biased to an opposite side of the force sensor in the circumferential direction.

4. The user interface device according to claim 1, wherein the at least one optical sensor is at a position where a finger of a hand contacts with the at least one optical sensor in a state in which the grip is gripped by the hand.

5. The user interface device according to claim 1, wherein the proximity sensor further includes a light guide surrounding the light emitter so as to guide light emitted by the light emitter to the detection range and/or surrounding the light receiver so as to guide light incident from the detection range to the light receiver.

6. The user interface device according to claim 1, wherein the proximity sensor further includes at least one of:

a first translucent portion that seals the light emitter so as to guide light emitted by the light emitter to the detection range; and a second translucent portion that seals the light receiver so as to guide light incident from the detection range to the light receiver.

7. The user interface device according to claim 1, further comprising a cover that covers the at least one optical sensor so as to guide light emitted by the light emitter in the at least one optical sensor to the detection range and/or guide light incident from the detection range to the light receiver.

8. The user interface device according to claim 7, wherein the cover includes a light diffusion portion that diffuses light emitted by the light emitter and guides the light to the detection range.

9. The user interface device according to claim 7, wherein the cover includes a light shielding portion that shields light emitted from the light emitter to an outside of the detection range and/or shields light incident on the light receiver from the outside of the detection range.

10. The user interface device according to claim 1, wherein the force sensor includes a light emitter different from the light emitter of the proximity sensor and a light receiver different from the light receiver of the proximity sensor; and the at least one optical sensor further includes:

a light emission control circuit to control the light emitter of the proximity sensor and the light emitter of the force sensor; and a light reception control circuit to control the light receiver of the proximity sensor and the light receiver of the force sensor.

11. The user interface device according to claim 1, wherein the user interface device is a controller for a game or human-machine interface.

12. The user interface device according to claim 1, wherein the force sensor is configured or programmed to detect forces using a piezoelectric method, an optical method, a strain resistance method, and capacitive method.

13. The user interface device according to claim 1, wherein the at least one optical sensor is at a position within a range of an angle of equal to or more than about 90° and equal to or less than about 180° from a predetermined reference position indicating an angle of 0° in the circumferential direction of the grip.

14. The user interface device according to claim 1, wherein the at least one optical sensor is at a position within a range of an angle of equal to or more than about 90° and equal to or less than about 270° from a predetermined reference position indicating an angle of 0° in the circumferential direction of the grip.

15. The user interface device according to claim 1, wherein the at least one optical sensor includes a dome portion and a wall portion.

16. The user interface device according to claim 15, wherein the dome portion and the wall portion are defined by an elastic structure.

17. The user interface device according to claim 15, wherein the dome portion and the wall portion have different hardnesses.

18. The user interface device according to claim 1, wherein the at least one optical sensor includes a sensor controller.

19. The user interface device according to claim 18, wherein the sensor controller includes a light emission control circuit, a light reception control circuit, a force sensor control circuit, and an interface circuit.

20. The user interface device according to claim 1, wherein the at least one sensor includes a wall portion including an open end or a wall portion surrounding an entire circumference of the light emitter and the light receiver.

* * * * *